United States Patent
Ko et al.

(10) Patent No.: US 12,101,271 B2
(45) Date of Patent: Sep. 24, 2024

(54) METHOD AND DEVICE FOR TRANSMITTING PSFCH AND PRS IN NR V2X

(71) Applicant: LG ELECTRONICS INC., Seoul (KR)

(72) Inventors: Woosuk Ko, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 373 days.

(21) Appl. No.: 17/763,012

(22) PCT Filed: Oct. 5, 2020

(86) PCT No.: PCT/KR2020/013444
§ 371 (c)(1),
(2) Date: Mar. 23, 2022

(87) PCT Pub. No.: WO2021/066592
PCT Pub. Date: Apr. 8, 2021

(65) Prior Publication Data
US 2022/0353035 A1    Nov. 3, 2022

(30) Foreign Application Priority Data

Oct. 2, 2019  (KR) .................... 10-2019-0122675

(51) Int. Cl.
*H04W 4/00*    (2018.01)
*H04L 5/00*    (2006.01)
(Continued)

(52) U.S. Cl.
CPC ........... *H04L 5/0048* (2013.01); *H04W 72/20* (2023.01); *H04B 7/06954* (2023.05); *H04W 72/40* (2023.01)

(58) Field of Classification Search
None
See application file for complete search history.

(56) References Cited

U.S. PATENT DOCUMENTS

2017/0215183 A1    7/2017    Gulati et al.
2019/0052436 A1    2/2019    Desai et al.
(Continued)

FOREIGN PATENT DOCUMENTS

| KR | 10-2018-0135480 A | 12/2018 |
|---|---|---|
| WO | 2015-122629 A1 | 8/2015 |
| WO | 2019-083344 A1 | 5/2019 |

*Primary Examiner* — Bob A Phunkulh
(74) *Attorney, Agent, or Firm* — BRYAN CAVE LEIGHTON PAISNER LLP

(57) ABSTRACT

According to one embodiment of the present disclosure, provided is a method in which a first device performs sidelink communication. The method may comprise: a step for determining at least one PRS resource for transmitting at least one PRS for sidelink positioning; a step for transmitting, to a second device, the at least one PRS on the basis of the at least one PRS resource; a step for receiving, from the second device, a PSCCH and a PSSCH associated with the PSCCH; a step for determining at least one PSFCH resource for transmitting the PSCCH or at least one PSFCH related to the PSSCH to the second device; and a step for transmitting, to the second device, the at least one PSFCH on the basis of the at least one PSFCH resource.

15 Claims, 27 Drawing Sheets

(51) Int. Cl.
*H04W 72/20* (2023.01)
*H04B 7/06* (2006.01)
*H04W 72/40* (2023.01)

(56) References Cited

U.S. PATENT DOCUMENTS

| | | | |
|---|---|---|---|
| 2021/0219268 A1* | 7/2021 | Li | H04W 72/20 |
| 2022/0030598 A1* | 1/2022 | Li | H04W 72/0446 |
| 2022/0038217 A1* | 2/2022 | Yoshioka | H04L 1/1819 |
| 2022/0070847 A1* | 3/2022 | Yoshioka | H04W 4/40 |
| 2022/0159622 A1* | 5/2022 | Yoshioka | H04W 72/02 |
| 2022/0232520 A1* | 7/2022 | Yoshioka | H04W 72/0453 |
| 2022/0232521 A1* | 7/2022 | Yoshioka | H04L 5/0053 |
| 2022/0376831 A1* | 11/2022 | Yoshioka | H04W 72/02 |
| 2024/0151815 A1* | 5/2024 | Wang | G01S 7/414 |

* cited by examiner

METHOD AND DEVICE FOR TRANSMITTING PSFCH AND PRS IN NR V2X

CROSS-REFERENCE TO RELATED APPLICATIONS

This application is the National Stage filing under 35 U.S.C. § 371 of International Application No. PCT/KR2020/013444, filed on Oct. 5, 2020, which claims the benefit of Korean Patent Application No. 10-2019-0122675, filed on Oct. 2, 2019, the contents of which are all hereby incorporated by reference herein in their entirety.

BACKGROUND OF THE DISCLOSURE

Field of the disclosure

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

For example, the CAM may include dynamic state information of the vehicle such as direction and speed, static data of the vehicle such as a size, and basic vehicle information such as an exterior illumination state, route details, or the like. For example, the UE may broadcast the CAM, and latency of the CAM may be less than 100 ms. For example, the UE may generate the DENM and transmit it to another UE in an unexpected situation such as a vehicle breakdown, accident, or the like. For example, all vehicles within a transmission range of the UE may receive the CAM and/or the DENM. In this case, the DENM may have a higher priority than the CAM.

Thereafter, regarding V2X communication, various V2X scenarios are proposed in NR. For example, the various V2X scenarios may include vehicle platooning, advanced driving, extended sensors, remote driving, or the like.

For example, based on the vehicle platooning, vehicles may move together by dynamically forming a group. For example, in order to perform platoon operations based on the vehicle platooning, the vehicles belonging to the group may receive periodic data from a leading vehicle. For example, the vehicles belonging to the group may decrease or increase an interval between the vehicles by using the periodic data.

For example, based on the advanced driving, the vehicle may be semi-automated or fully automated. For example, each vehicle may adjust trajectories or maneuvers, based on data obtained from a local sensor of a proximity vehicle and/or a proximity logical entity. In addition, for example, each vehicle may share driving intention with proximity vehicles.

For example, based on the extended sensors, raw data, processed data, or live video data obtained through the local sensors may be exchanged between a vehicle, a logical entity, a UE of pedestrians, and/or a V2X application server. Therefore, for example, the vehicle may recognize a more improved environment than an environment in which a self-sensor is used for detection.

For example, based on the remote driving, for a person who cannot drive or a remote vehicle in a dangerous environment, a remote driver or a V2X application may operate or control the remote vehicle. For example, if a route is predictable such as public transportation, cloud computing based driving may be used for the operation or control of the remote vehicle. In addition, for example, an access for a cloud-based back-end service platform may be considered for the remote driving.

Meanwhile, a scheme of specifying service requirements for various V2X scenarios such as vehicle platooning, advanced driving, extended sensors, remote driving, or the like is discussed in NR-based V2X communication.

SUMMARY OF THE DISCLOSURE

Technical Objects

An object of the present disclosure is to provide a sidelink (SL) communication method between apparatuses (or UEs) and an apparatus (or UE) for performing the same.

Another technical task of the present disclosure is to provide a method for transmitting a Physical Sidelink Feedback Channel (PSFCH) and a Positioning Reference Signal (PRS) in NR V2X and an apparatus (or UE) for performing the same.

Technical Solutions

According to an embodiment of the present disclosure, a method for performing, by a first apparatus, sidelink communication may be proposed. The method may comprise: determining at least one positioning reference signal (PRS) resource for transmitting at least one PRS for sidelink positioning; transmitting the at least one PRS to a second apparatus based on the at least one PRS resource; receiving a physical sidelink control channel (PSCCH) and a physical sidelink shared channel (PSSCH) related to the PSCCH from the second apparatus; determining at least one physical sidelink feedback channel (PSFCH) resource for transmitting at least one PSFCH related to the PSCCH or the PSSCH to the second apparatus; and transmitting the at least one PSFCH to the second apparatus based on the at least one PSFCH resource, wherein the at least one PRS resource is determined among a plurality of PRS resources for sidelink positioning, wherein the at least one PSFCH resource is determined among a plurality of PSFCH resources related to the PSCCH and the PSSCH, wherein a time interval of the plurality of PRS resources and a time interval of the plurality of PSFCH resources overlap each other, and wherein a frequency interval between the plurality of PSFCH resources is the same as a first frequency size.

According to an embodiment of the present disclosure, a first apparatus for performing wireless communication may be proposed. The first apparatus may comprise: one or more memories storing instructions; one or more transceivers; and one or more processors connected to the one or more memories and the one or more transceivers, wherein the one or more processors execute the instructions to: determine at least one positioning reference signal (PRS) resource for transmitting at least one PRS for sidelink positioning; transmit the at least one PRS to a second apparatus based on the at least one PRS resource; receive a physical sidelink control channel (PSCCH) and a physical sidelink shared channel (PSSCH) related to the PSCCH from the second apparatus; determine at least one physical sidelink feedback channel (PSFCH) resource for transmitting at least one PSFCH related to the PSCCH or the PSSCH to the second apparatus; and transmit the at least one PSFCH to the second apparatus based on the at least one PSFCH resource, wherein the at least one PRS resource is determined among a plurality of PRS resources for sidelink positioning, wherein the at least one PSFCH resource is determined among a plurality of PSFCH resources related to the PSCCH and the PSSCH, wherein a time interval of the plurality of PRS resources and a time interval of the plurality of PSFCH resources overlap each other, and wherein a frequency interval between the plurality of PSFCH resources is the same as a first frequency size.

According to an embodiment of the present disclosure, an apparatus (or chip(set)) configured to control a first user equipment (UE) may be proposed. The apparatus may comprise: one or more processors; and one or more memories operably connectable to the one or more processors and storing instructions, wherein the one or more processors execute the instructions to: determine at least one positioning reference signal (PRS) resource for transmitting at least one PRS for sidelink positioning; transmit the at least one PRS to a second UE based on the at least one PRS resource; receive a physical sidelink control channel (PSCCH) and a physical sidelink shared channel (PSSCH) related to the PSCCH from the second UE; determine at least one physical sidelink feedback channel (PSFCH) resource for transmitting at least one PSFCH related to the PSCCH or the PSSCH to the second UE; and transmit the at least one PSFCH to the second UE based on the at least one PSFCH resource, wherein the at least one PRS resource is determined among a plurality of PRS resources for sidelink positioning, wherein the at least one PSFCH resource is determined among a plurality of PSFCH resources related to the PSCCH and the PSSCH, wherein a time interval of the plurality of PRS resources and a time interval of the plurality of PSFCH resources overlap each other, and wherein a frequency interval between the plurality of PSFCH resources is the same as a first frequency size.

According to an embodiment of the present disclosure, a non-transitory computer-readable storage medium storing instructions may be proposed. The instructions, when executed, may cause a first apparatus to: determine at least one positioning reference signal (PRS) resource for transmitting at least one PRS for sidelink positioning; transmit the at least one PRS to a second apparatus based on the at least one PRS resource; receive a physical sidelink control channel (PSCCH) and a physical sidelink shared channel (PSSCH) related to the PSCCH from the second apparatus; determine at least one physical sidelink feedback channel (PSFCH) resource for transmitting at least one PSFCH related to the PSCCH or the PSSCH to the second apparatus; and transmit the at least one PSFCH to the second apparatus based on the at least one PSFCH resource, wherein the at least one PRS resource is determined among a plurality of PRS resources for sidelink positioning, wherein the at least one PSFCH resource is determined among a plurality of PSFCH resources related to the PSCCH and the PSSCH, wherein a time interval of the plurality of PRS resources and a time interval of the plurality of PSFCH resources overlap each other, and wherein a frequency interval between the plurality of PSFCH resources is the same as a first frequency size.

According to an embodiment of the present disclosure, a method for performing, by a second apparatus, sidelink communication may be proposed. The method may comprise: receiving at least one PRS from a first apparatus based on at least one PRS resource; transmitting a physical sidelink control channel (PSCCH) and a physical sidelink shared channel (PSSCH) related to the PSCCH to the first apparatus; and receiving at least one PSFCH from the first apparatus based on at least one PSFCH resource, wherein the at least one PRS resource is determined among a plurality of PRS resources for sidelink positioning, wherein the at least one PSFCH resource is determined among a plurality of PSFCH resources related to the PSCCH and the PSSCH, wherein a time interval of the plurality of PRS resources and a time interval of the plurality of PSFCH resources overlap each other, and wherein a frequency interval between the plurality of PSFCH resources is the same as a first frequency size.

According to an embodiment of the present disclosure, a second apparatus for performing wireless communication may be proposed. The second apparatus may comprise: one or more memories storing instructions; one or more transceivers; and one or more processors connected to the one or more memories and the one or more transceivers, wherein the one or more processors execute the instructions to: receive at least one PRS from a first apparatus based on at least one PRS resource; transmit a physical sidelink control channel (PSCCH) and a physical sidelink shared channel (PSSCH) related to the PSCCH to the first apparatus; and receive at least one PSFCH from the first apparatus based on at least one PSFCH resource, wherein the at least one PRS resource is determined among a plurality of PRS resources for sidelink positioning, wherein the at least one PSFCH resource is determined among a plurality of PSFCH resources related to the PSCCH and the PSSCH, wherein a time interval of the plurality of PRS resources and a time interval of the plurality of PSFCH resources overlap each other, and wherein a frequency interval between the plurality of PSFCH resources is the same as a first frequency size.

Effects of the Disclosure

According to the present disclosure, sidelink communication between apparatus (or UEs) can be efficiently performed.

DESCRIPTION OF EXEMPLARY EMBODIMENTS

Figure 1:
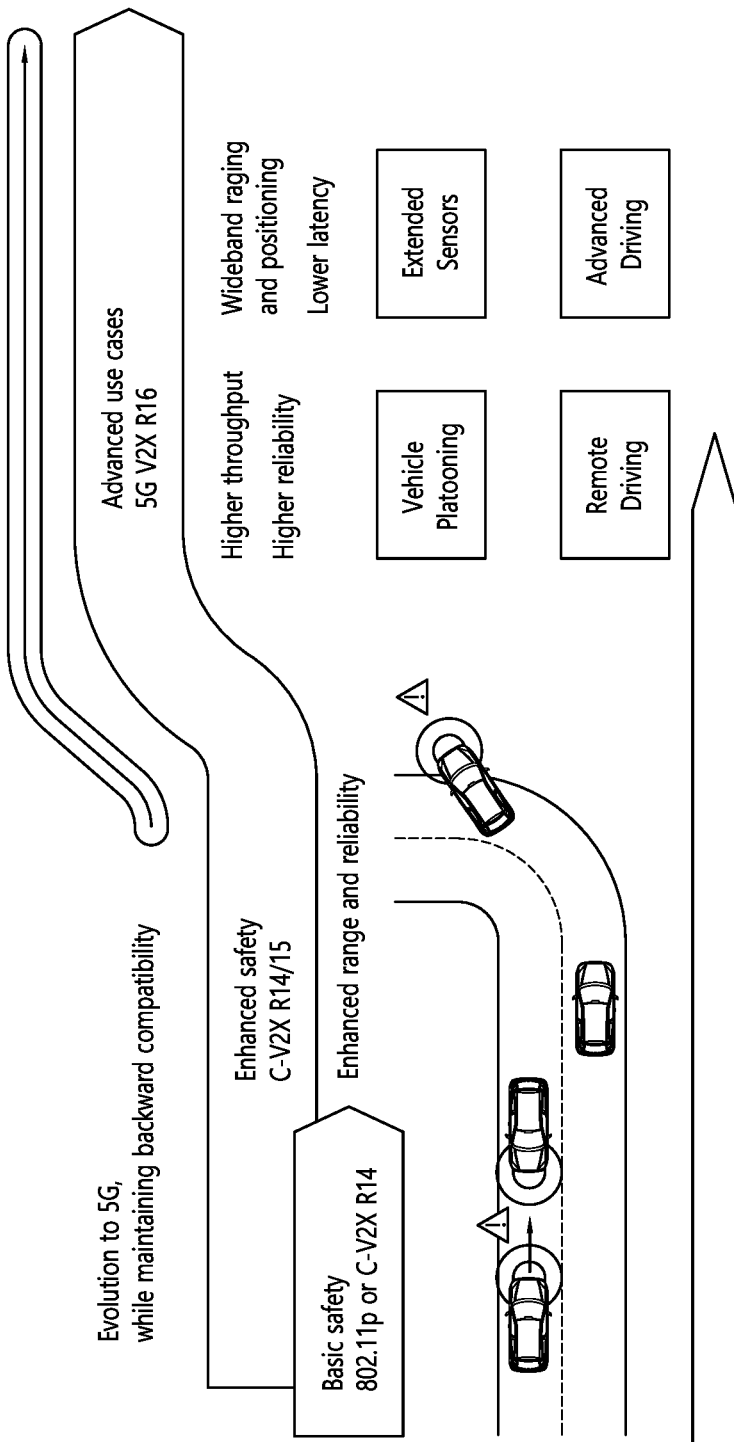
FIG. 1 is a drawing for describing V2X communication based on NR, compared to V2X communication based on RAT used before NR.

In the present disclosure, "A or B" may mean "only A", "only B" or "both A and B." In other words, in the present disclosure, "A or B" may be interpreted as "A and/or B". For example, in the present disclosure, "A, B, or C" may mean "only A", "only B", "only C", or "any combination of A, B, C".

A slash (/) or comma used in the present disclosure may mean "and/or". For example, "A/B" may mean "A and/or B". Accordingly, "A/B" may mean "only A", "only B", or "both A and B". For example, "A, B, C" may mean "A, B, or C".

In the present disclosure, "at least one of A and B" may mean "only A", "only B", or "both A and B". In addition, in the present disclosure, the expression "at least one of A or B" or "at least one of A and/or B" may be interpreted as "at least one of A and B".

In addition, in the present disclosure, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present disclosure may mean "for example". Specifically, when indicated as "control information (PDCCH)", it may mean that "PDCCH" is proposed as an example of the "control information". In other words, the "control information" of the present disclosure is not limited to "PDCCH", and "PDDCH" may be proposed as an example of the "control information". In addition, when indicated as "control information (i.e., PDCCH)", it may also mean that "PDCCH" is proposed as an example of the "control information".

A technical feature described individually in one figure in the present disclosure may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
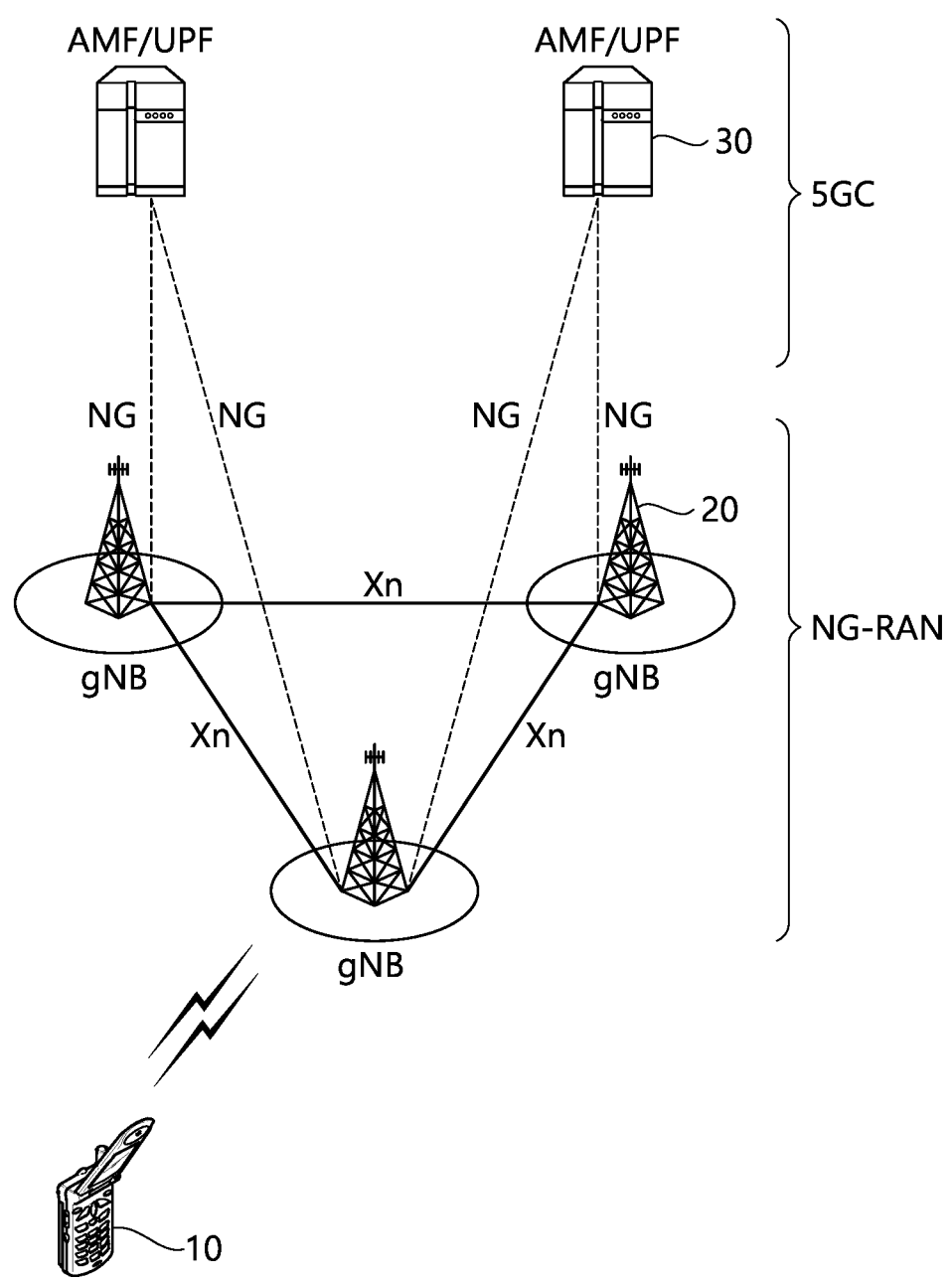
FIG. 2 shows a structure of an NR system, based on an embodiment of the present disclosure.

FIG. 2 shows a structure of an NR system, based on an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Figure 3:
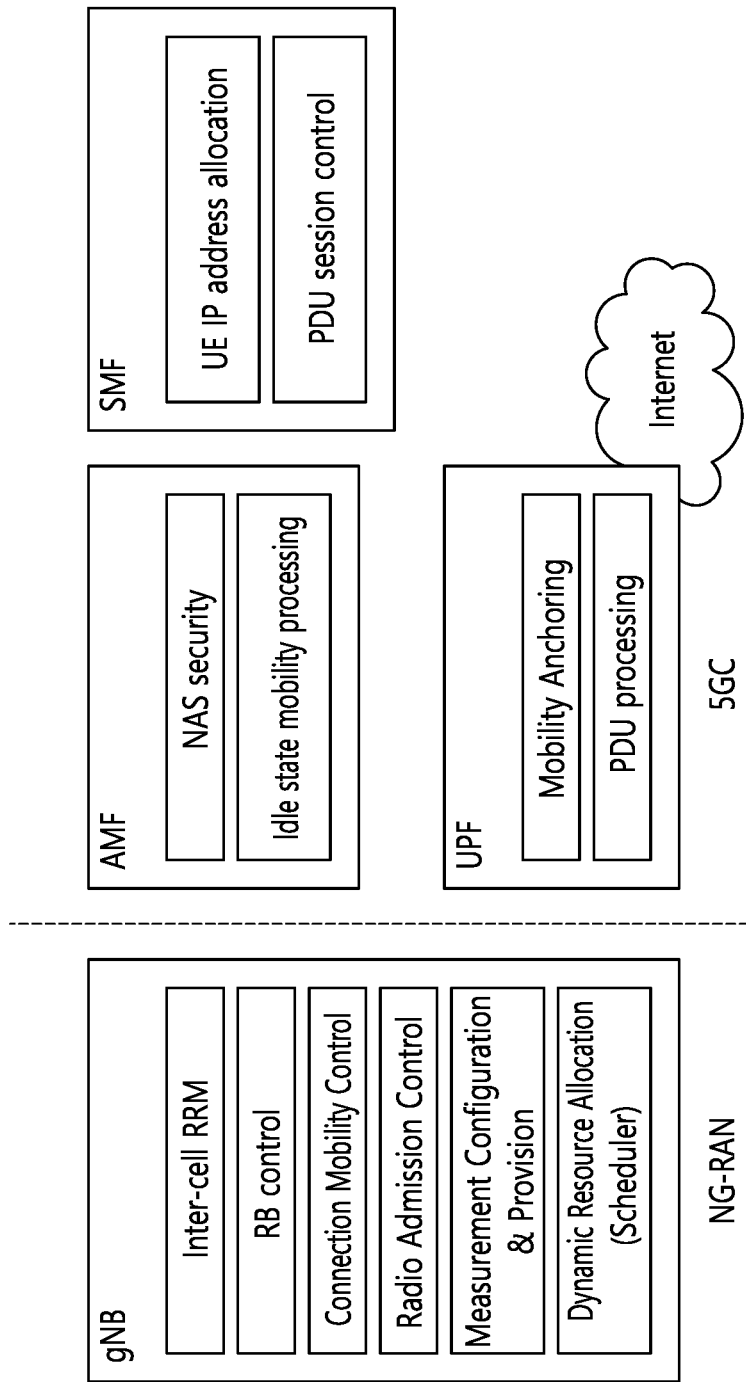
FIG. 3 shows a functional division between an NG-RAN and a SGC, based on an embodiment of the present disclosure.

FIG. 3 shows a functional division between an NG-RAN and a 5GC, based on an embodiment of the present disclosure. The embodiment of FIG. 3 may be combined with various embodiments of the present disclosure.

Referring to FIG. 3, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 4A:
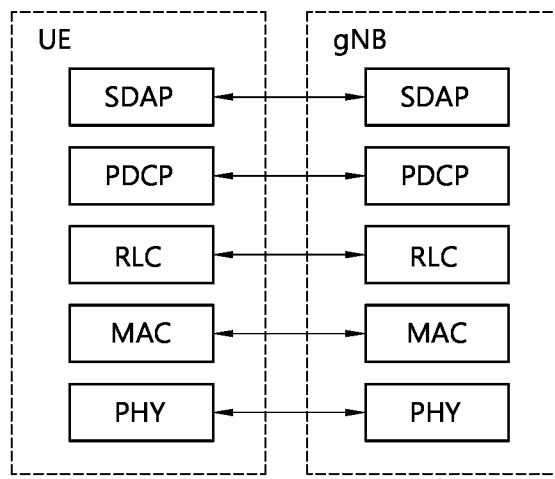
FIGS. 4A and 4B show a radio protocol architecture, based on an embodiment of the present disclosure.
Figure 4B:
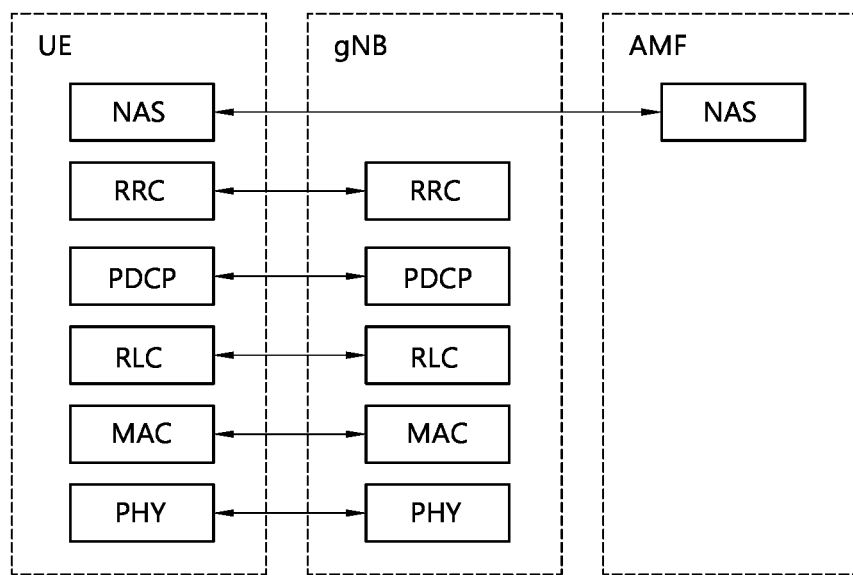

FIGS. 4A and 4B show a radio protocol architecture, based on an embodiment of the present disclosure. The embodiment of FIGS. 4A and 4B may be combined with various embodiments of the present disclosure. Specifically, FIG. 4A shows a radio protocol architecture for a user plane, and FIG. 4B shows a radio protocol architecture for a control plane. The user plane corresponds to a protocol stack for user data transmission, and the control plane corresponds to a protocol stack for control signal transmission.

Referring to FIGS. 4A and 4B, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel The transport channel is classified according to how and with what characteristics data is transmitted through a radio interface.

Between different physical layers, i.e., a physical layer of a transmitter and a physical layer of a receiver, data are transferred through the physical channel The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., the MAC layer, the RLC layer, and the packet data convergence protocol (PDCP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several sub-carriers in a frequency domain. One sub-frame includes a plurality of OFDM symbols in the time domain. A resource block is a unit of resource allocation, and consists of a plurality of OFDM symbols and a plurality of sub-carriers. Further, each sub-frame may use specific sub-carriers of specific OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Figure 5:
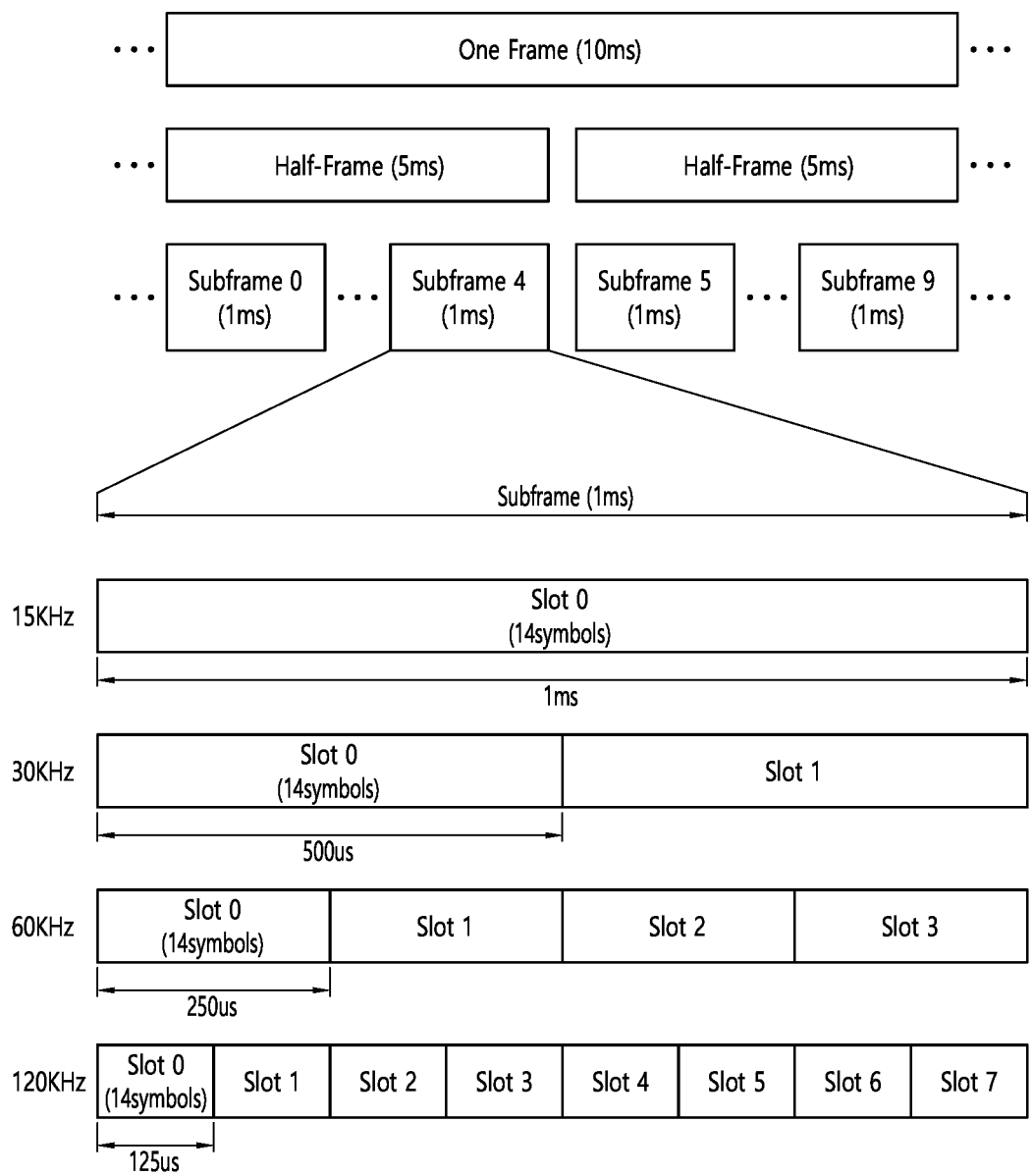
FIG. 5 shows a structure of an NR system, based on an embodiment of the present disclosure.

FIG. 5 shows a structure of an NR system, based on an embodiment of the present disclosure. The embodiment of FIG. 5 may be combined with various embodiments of the present disclosure.

Referring to FIG. 5, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS ($15*2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS ($15*2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 6:
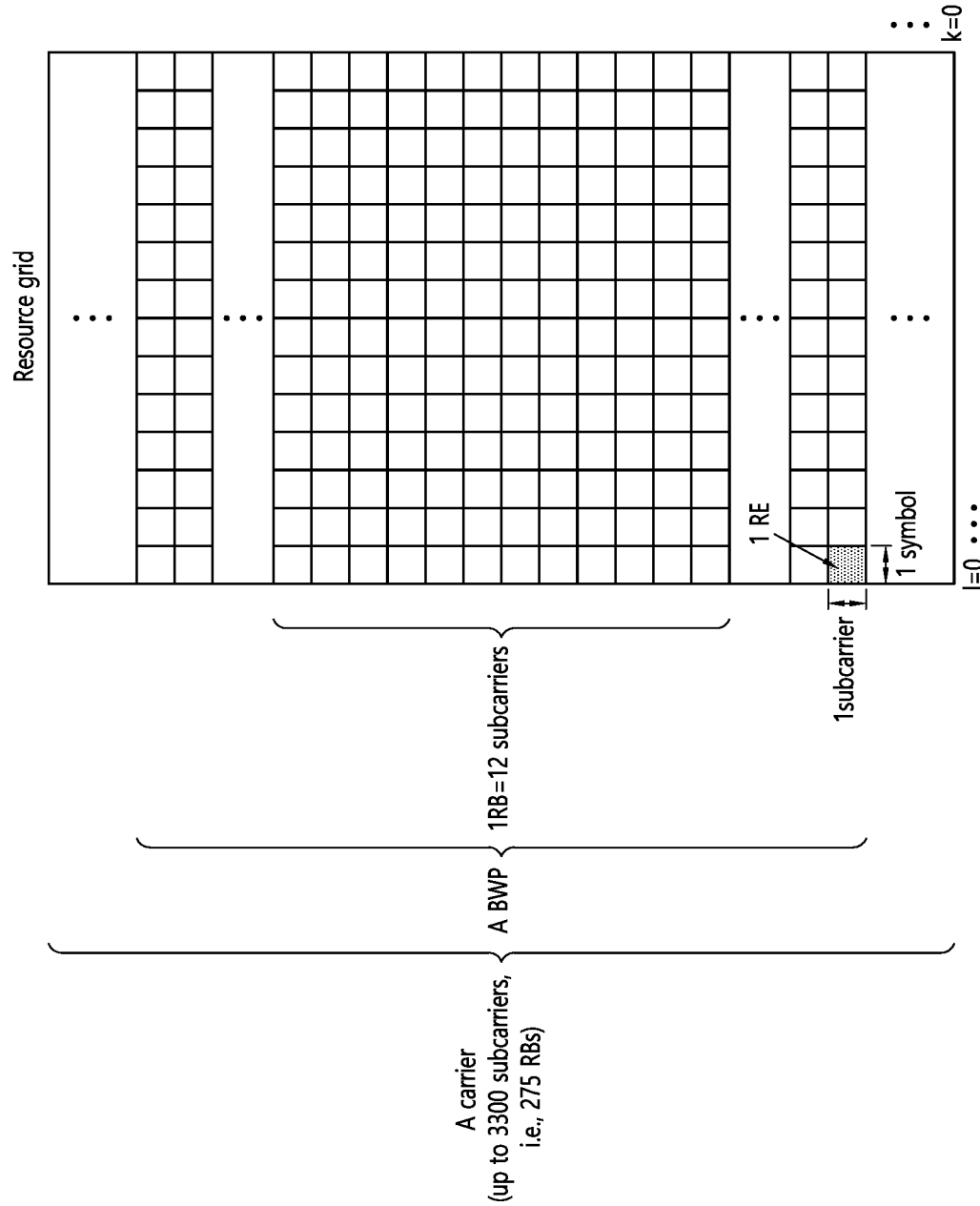
FIG. 6 shows a structure of a slot of an NR frame, based on an embodiment of the present disclosure.

FIG. 6 shows a structure of a slot of an NR frame, based on an embodiment of the present disclosure. The embodiment of FIG. 6 may be combined with various embodiments of the present disclosure.

Referring to FIG. 6, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a position change of the bandwidth, or a change in subcarrier spacing of the bandwidth.

For example, the bandwidth may be decreased during a period in which activity is low to save power. For example, the position of the bandwidth may move in a frequency domain. For example, the position of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be called a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information—reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORE-SET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 7:
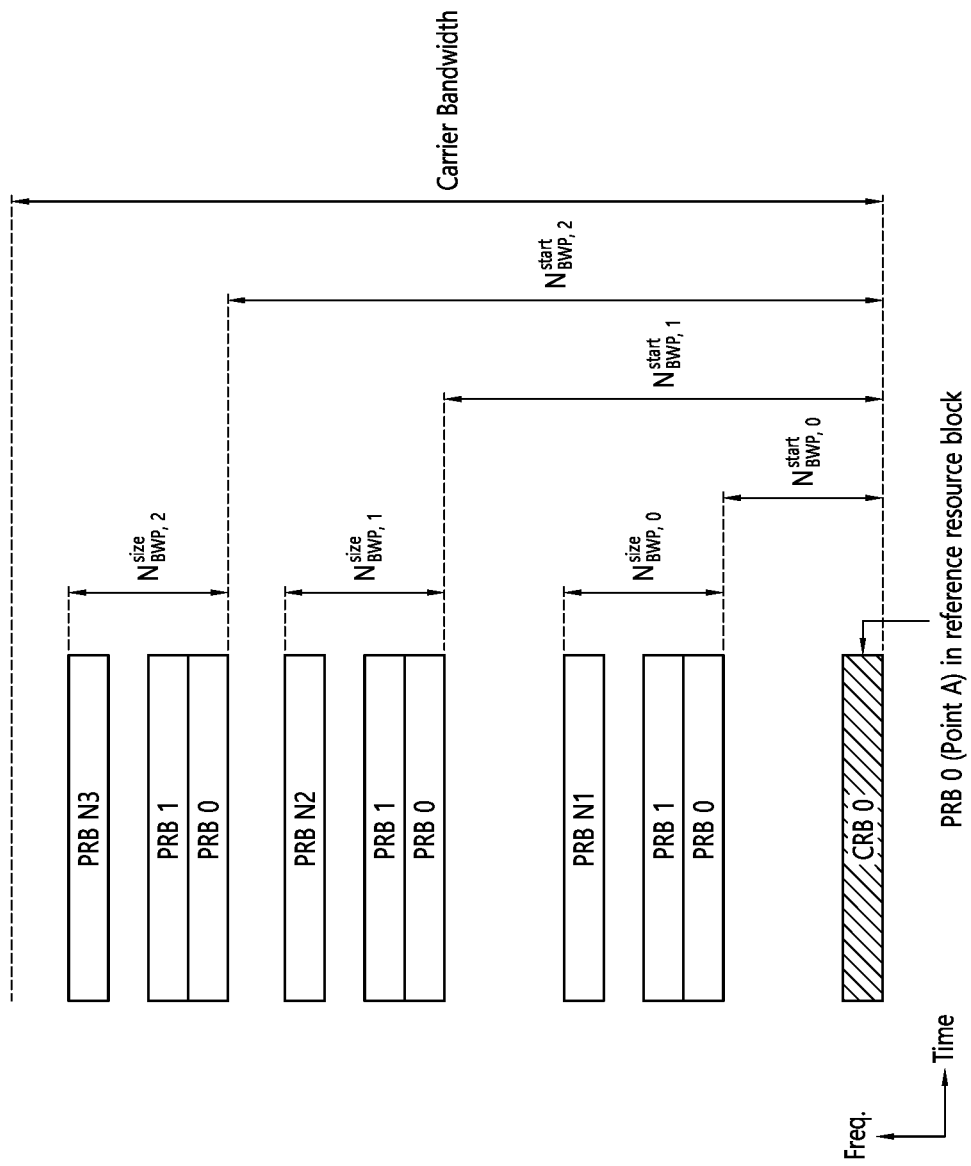
FIG. 7 shows an example of a BWP, based on an embodiment of the present disclosure.

FIG. 7 shows an example of a BWP, based on an embodiment of the present disclosure. The embodiment of FIG. 7 may be combined with various embodiments of the present disclosure. It is assumed in the embodiment of FIG. 7 that the number of BWPs is 3.

Referring to FIG. 7, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

Figure 8A:
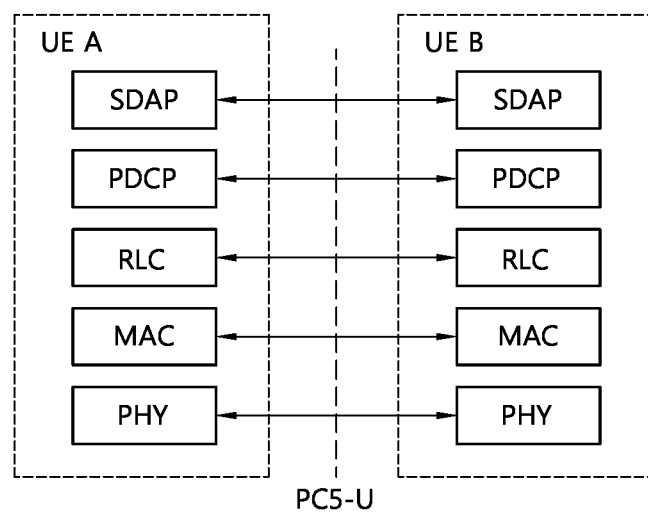
FIGS. 8A and 8B show a radio protocol architecture for a SL communication, based on an embodiment of the present disclosure.
Figure 8B:
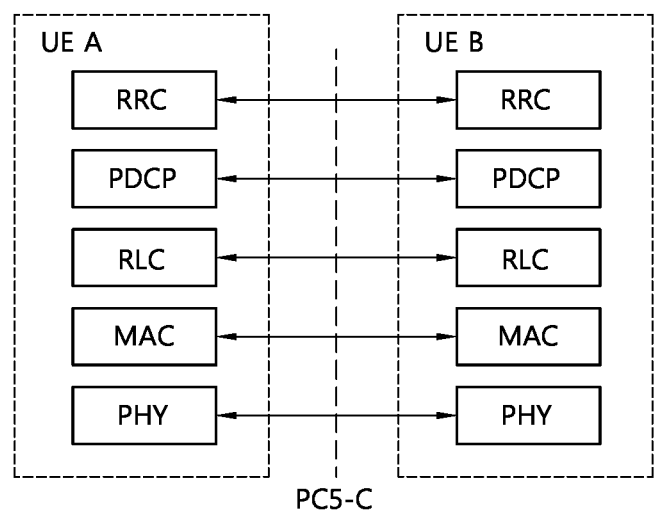

FIGS. 8A and 8B show a radio protocol architecture for a SL communication, based on an embodiment of the present disclosure. The embodiment of FIGS. 8A and 8B may be combined with various embodiments of the present disclosure. More specifically, FIG. 8A shows a user plane protocol stack, and FIG. 8B shows a control plane protocol stack.

Hereinafter, a sidelink synchronization signal (SLSS) and synchronization information will be described.

The SLSS may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit CRC.

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 9:
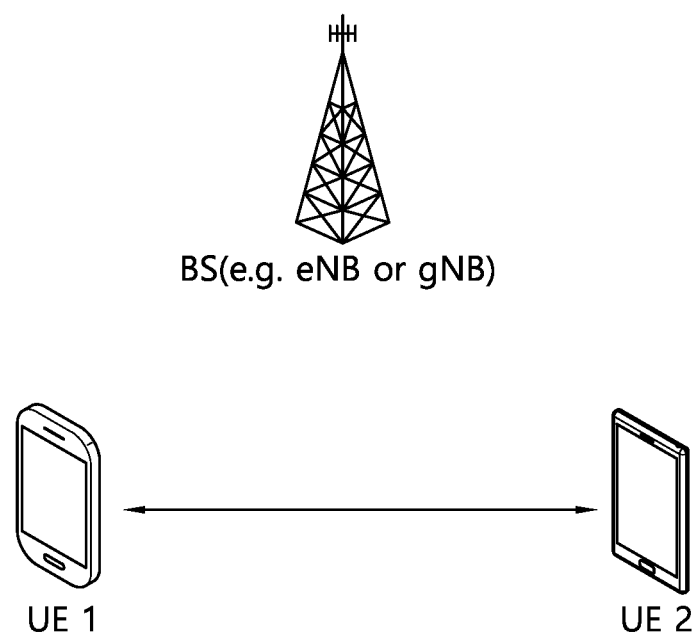
FIG. 9 shows a UE performing V2X or SL communication, based on an embodiment of the present disclosure.

FIG. 9 shows a UE performing V2X or SL communication, based on an embodiment of the present disclosure. The embodiment of FIG. 9 may be combined with various embodiments of the present disclosure.

Referring to FIG. 9, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 10A:
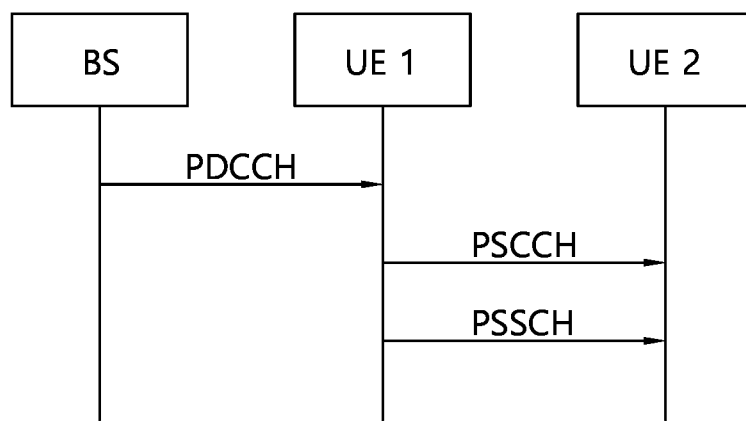
FIGS. 10A and 10B show a procedure of performing V2X or SL communication by a UE based on a transmission mode, based on an embodiment of the present disclosure.
Figure 10B:
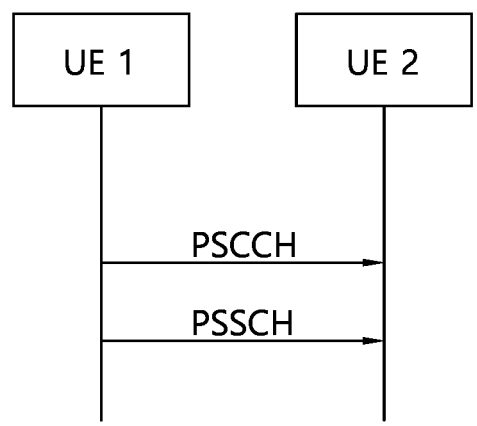

FIGS. 10A and 10B show a procedure of performing V2X or SL communication by a UE based on a transmission mode, based on an embodiment of the present disclosure. The embodiment of FIGS. 10A and 10B may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, FIG. 10A shows a UE operation related to an LTE transmission mode 1 or an LTE transmission mode 3. Alternatively, for example, FIG. 10A shows a UE operation related to an NR resource allocation mode 1. For example, the LTE transmission mode 1 may be applied to general SL communication, and the LTE transmission mode 3 may be applied to V2X communication.

For example, FIG. 10B shows a UE operation related to an LTE transmission mode 2 or an LTE transmission mode 4. Alternatively, for example, FIG. 10B shows a UE operation related to an NR resource allocation mode 2.

Referring to FIG. 10A, in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (more specifically, downlink control information (DCI)), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to FIG. 10B, in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 11A:
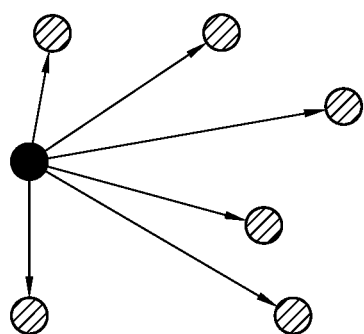
FIGS. 11A to 11C show three cast types, based on an embodiment of the present disclosure.
Figure 11B:
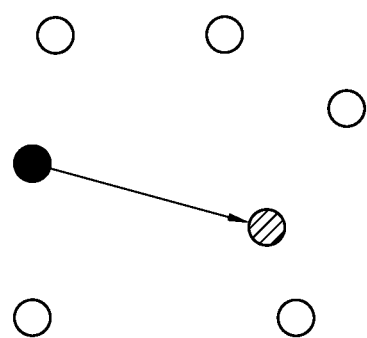
Figure 11C:
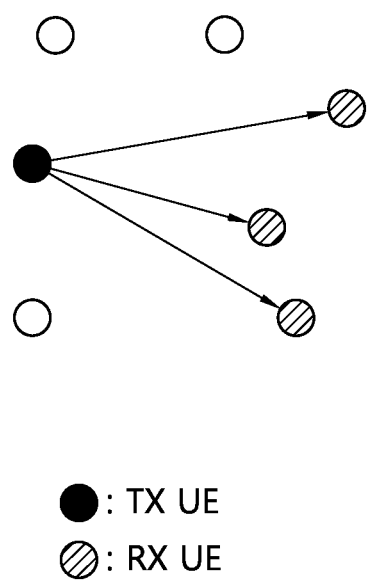

FIGS. 11A to 11C show three cast types, based on an embodiment of the present disclosure. The embodiment of FIGS. 11A to 11C may be combined with various embodiments of the present disclosure. Specifically, FIG. 11A shows broadcast-type SL communication, FIG. 11B shows unicast type-SL communication, and FIG. 11C shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Meanwhile, in SL communication, a UE needs to efficiently select resource(s) for SL transmission. Hereinafter, based on various embodiments of the present disclosure, a method for a UE to efficiently select resource(s) for SL transmission and an apparatus supporting the same will be described. In various embodiments of the present disclosure, SL communication may include V2X communication.

At least one of the methods that are proposed based on the various embodiments of the present disclosure may be applied to at least one of unicast communication, groupcast communication, and/or broadcast communication.

At least one of the methods that are proposed based on the various embodiments of the present disclosure may be applied not only to PC5 interface or SL interface (e.g., PSCCH, PSSCH, PSBCH, PSSS/SSSS, and so on) based SL communication or V2X communication but also to Uu interface (e.g., PUSCH, PDSCH, PDCCH, PUCCH, and so on) based SL communication or V2X communication.

In the various embodiments of the present disclosure, receiving operation(s) (or action(s)) of the UE may include decoding operation(s) and/or receiving operation(s) of SL channel(s) and/or SL signal(s) (e.g., PSCCH, PSSCH, PSFCH, PSBCH, PSSS/SSSS, and so on). Receiving operation(s) of the UE may include decoding operation(s) and/or receiving operation(s) of WAN DL channel(s) and/or WAN DL signal(s) (e.g., PDCCH, PDSCH, PSS/SSS, and so on). Receiving operation(s) of the UE may include sensing operation(s) and/or channel busy ratio (CBR) measuring operation(s). In the various embodiments of the present disclosure, Sensing operation(s) of the UE may include PSSCH-RSRP measuring operation(s) based on PSSCH DM-RS sequence(s), PSSCH-RSRP measuring operation(s) based on PSSCH DM-RS sequence(s), which is scheduled by a PSCCH that is successfully decoded by the UE, sidelink RSSI (S-RSSI) measuring operation(s), and/or S-RSSI measuring operation(s) based on subchannel(s) related to V2X resource pool(s). In the various embodiments of the present disclosure, transmitting operation(s) of the UE may include transmitting operation(s) of SL channel(s) and/or SL signal(s) (e.g., PSCCH, PSSCH, PSFCH, PSBCH, PSSS/SSSS, and so on). Transmitting operation(s) may include transmitting operation(s) of WAN UL channel(s) and/or WAN UL signal(s) (e.g., PUSCH, PUCCH, SRS, and so on). In the various embodiments of the present disclosure, a synchronization signal may include an SLSS and/or a PSBCH.

In the various embodiments of the present disclosure, configuration may include signaling, signaling from a network, configuration from a network, and/or a pre-configuration from a network. In the various embodiments of the present disclosure, definition may include signaling, signaling from a network, configuration from a network, and/or a pre-configuration from a network. In the various embodiments of the present disclosure, designation may include signaling, signaling from a network, configuration from a network, and/or a pre-configuration from a network.

In the various embodiments of the present disclosure, ProSe Per Packet Priority (PPPP) may be replaced with ProSe Per Packet Reliability (PPPR), and PPPR may be replaced with PPPP. For example, as the PPPP value becomes smaller, this may indicate a high priority, and, as the PPPP value becomes greater, this may indicate a low priority. For example, as the PPPR value becomes smaller, this may indicate a high reliability, and, as the PPPR value becomes greater, this may indicate a low reliability. For example, a PPPP value related to a service, a packet or a message being related to a high priority may be smaller than a PPPP value related to a service, a packet or a message being related to a low priority. For example, a PPPR value related to a service, a packet or a message being related to a high reliability may be smaller than a PPPR value related to a service, a packet or a message being related to a low reliability.

In the various embodiments of the present disclosure, a session may include at least one of a unicast session (e.g., a unicast session for SL), a groupcast/multicast session (e.g., a groupcast/multicast session for SL), and/or a broadcast session (e.g., a broadcast session for SL).

In the various embodiments of the present disclosure, a carrier may be replaced with at least one of a BWP and/or a resource pool, or vice versa. For example, a carrier may include at least one of a BWP and/or a resource pool. For example, a carrier may include one or more BWPs. For example, a BWP may include one or more resource pools.

When performing communication through the sidelink, in a unicast or groupcast application, a receiving UE (or RX UE) may feedback whether data transmitted by a transmitting UE (or TX UE) is received to the transmitting UE through ACK or NACK. In this case, a feedback may be transmitted through a dedicated channel of the physical layer such as PSFCH. A PSFCH may be composed of the last symbol or symbols including the last symbol in a sidelink slot, and a resource occupied by a PSFCH may be determined by the amount of data to be fed back.

At this time, if a PSFCH is to be transmitted in another channel or signal and the frequency domain at the same time, a method of efficiently using resources of a transmission channel while maintaining the reception performance for a PSFCH is required. The present disclosure proposes a method of efficiently multiplexing a PSFCH and a reference signal for positioning transmitted by an anchor node such as UE or gNB/eNB/RSU in the frequency domain, for a positioning application to obtain the location information of a UE.

In the PSFCH, when a relatively small amount of data is transmitted according to the data transmission amount to be fed back, a short format of a sequence type may be used, when a relatively large amount of data is transmitted, a long format in which channel coding is applied and more resources are allocated and transmitted may be used. The reference signal for positioning may be a PRS transmitted from gNB/eNB/RSU, etc., an SRS transmitted by a apparatus such as UE, an SSB signal for time synchronization, or reference signals such as DM-RS, CSI-RS (Channel State Information RS), CRS (Cell Specific RS), TRS (Tracking RS), PT-RS (Phase Tracking RS), etc. In the following description, a reference signal for (sidelink) positioning is referred to as a Positioning RS (PRS).

A method of multiplexing a PSFCH and a PRS may include multiplexing through Time-Division Multiplexing (TDM) in the time domain, multiplexing through Frequency-Division Multiplexing (FDM) in the frequency domain, or using a Code-Division Multiplexing (CDM) method, that modulates different codes and overlaps them in time or frequency domain. The present disclosure proposes a method of performing multiplexing by interleaving a PSFCH and a PRS with each other.

Figure 12:
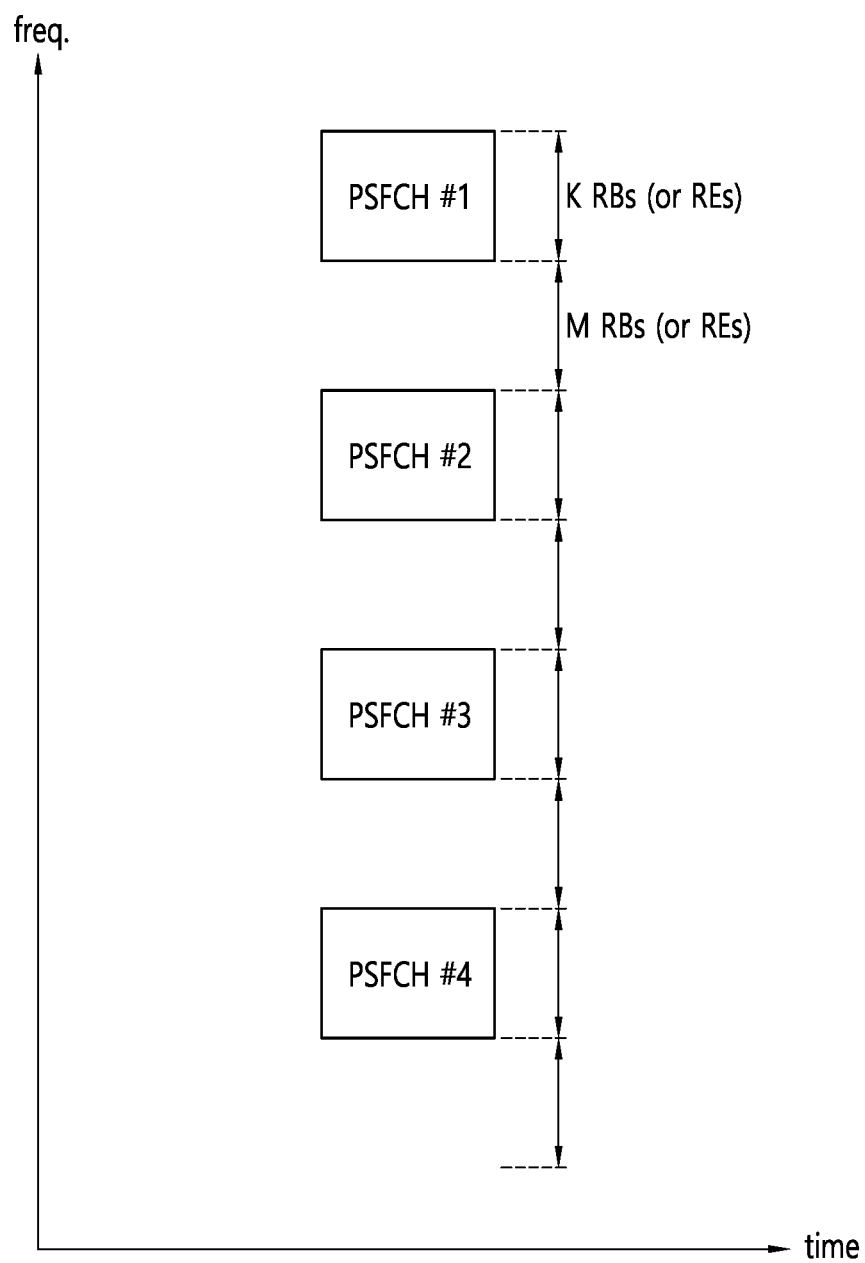
FIG. 12 shows an example in which a PSFCH is transmitted.

FIG. 12 shows an example in which a PSFCH is transmitted.

A PSFCH is transmitted through a channel resource configured for each sidelink entity (SL entity), an entire signal transmitted by occupying each channel resource by PSFCHs transmitted by each sidelink entity may be, for example, as shown in FIG. 12.

In FIG. 12, a total of four sidelink entities each transmit a PSFCH, and a frequency domain resource occupied by each PSFCH is K RBs (or K REs). In addition, since each PSFCH is separated from each other by the same interval M RBs (or M REs), the effect of finally reducing the PAPR of a time domain waveform can be obtained. A value K of the number of resources in the frequency domain occupied by PSFCH and the value M, which is an interval between PSFCH resources, may be (pre-) configured by higher layer signaling or may be signaled by DCI or MAC CE. Here, K and M may be positive integers.

When PSFCH resources are used at regular intervals in the entire SL communication system as shown in FIG. 12, a comb pattern is used so that a plurality of sidelink entities can transmit PRS, a space apart between PSFCH resources may be used as an interval between REs occupied by PRSs in a comb pattern. By configuring a comb pattern of a PRS in this way, a PSFCH and a PRS can be multiplexed in the form of FDM in the frequency domain as shown in FIG. 13 to be described later.

Figure 13:
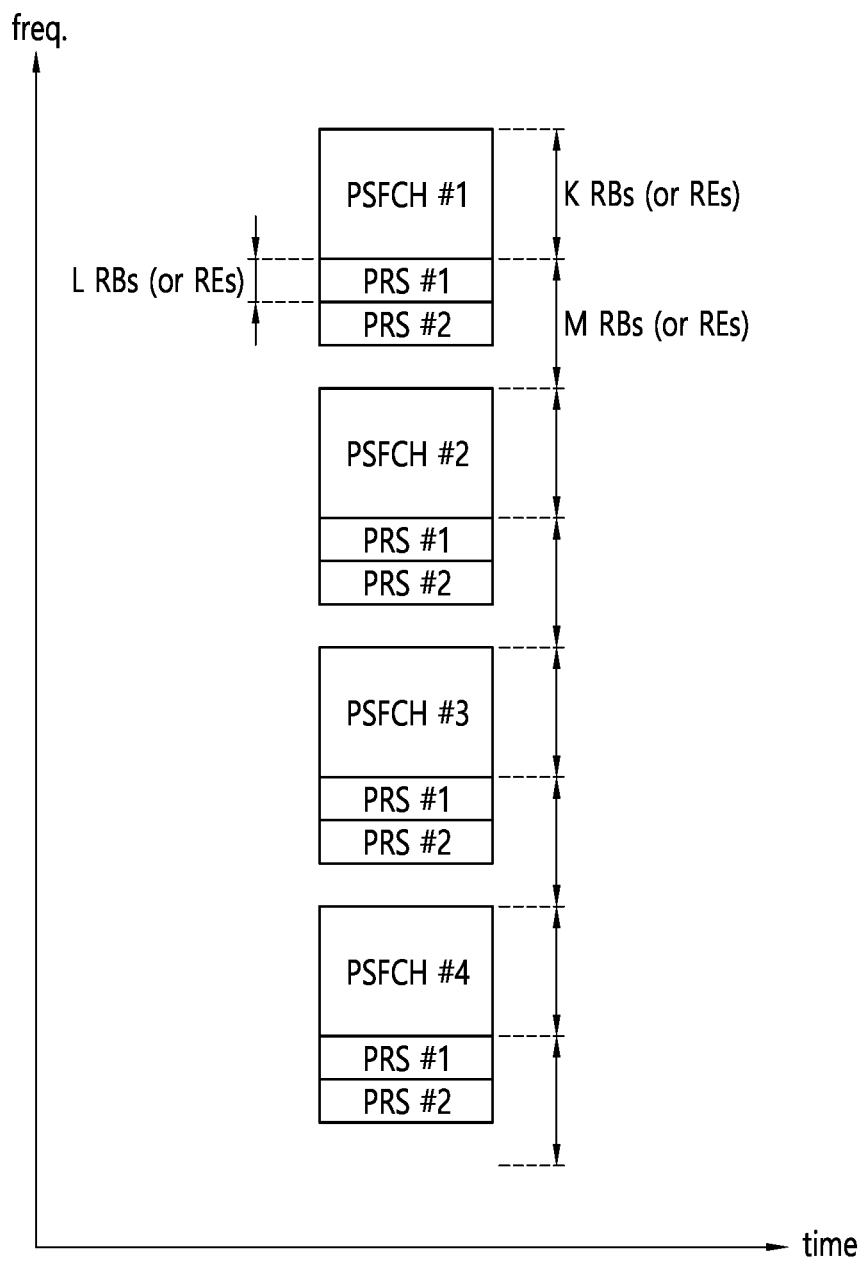
FIG. 13 shows an example in which PSFCH and PRS are transmitted.

FIG. 13 shows an example in which PSFCH and PRS are transmitted.

In FIG. 13, there are a total of two UEs transmitting PRSs for a positioning service, and resources each PRS occupies in the frequency domain are L RBs (or REs). In this way, by performing FDM transmission of a PSFCH and a PRS in the frequency domain of PSFCH symbols, each sidelink entity may multiplex and transmit a PSFCH and a PRS without conflicting with each other in resource use. At this time, a PSFCH is transmitted through continuous resources for K RBs (or K REs) per sidelink entity, but a PRS is transmitted through distributed resources allocated at intervals as far apart as M RBs (or M REs) per sidelink entity, and the method presented in the disclosure has the advantage of efficiently multiplexing a PSFCH transmitted continuously per sidelink entity and a PRS transmitted distributedly per sidelink entity from the viewpoint of the entire SL communication system. Here, L, K and M may be positive integers.

Another embodiment of multiplexing a PSFCH transmission and a PRS transmission by a CDM method instead of a FDM method will be described later in FIG. 14.

Figure 14:
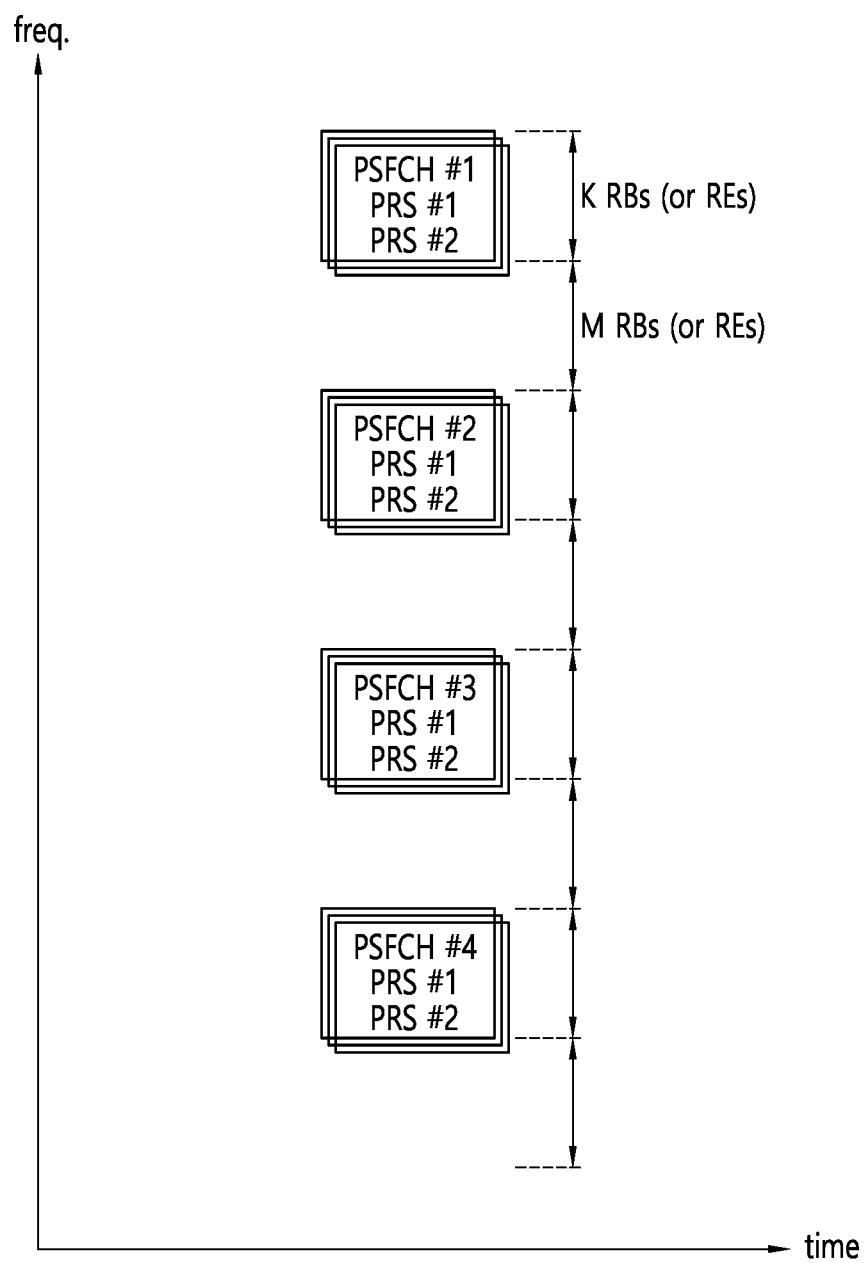
FIG. 14 shows another example in which PSFCH and PRS are transmitted.

FIG. 14 shows another example in which PSFCH and PRS are transmitted.

In FIG. 14, a PSFCH is scheduled and transmitted in the same form as in the embodiment described above in FIG. 13, although a PRS is distributedly transmitted for each sidelink entity, each distributed portion may be transmitted identically to resources of the frequency domain occupied by a PSFCH. Also, unlike the embodiment described above in FIG. 13, a PRS may not be transmitted using different resources in the frequency domain, but the PRS may be transmitted using the same resource as a PSFCH. Therefore, in order for a receiving UE to distinguish between a PSFCH and a PRS, the PSFCH and the PRS must be CDM with orthogonal characteristics. Through this, a receiving UE may be able to independently detect/decode a PSFCH and a PRS without mutual interference.

To work like this, for a sequence used for a PSFCH and a sequence used for a PRS, a sequence generated using different generator polynomials may be used, or the same generator polynomial but different cyclic shifts (or phase rotation in the frequency domain) may be used. When each independent sequence is generated using different generator polynomials, each sequence can be used for a PSFCH and a PRS by using a sequence pair that can minimize mutual interference from the viewpoint of sequence detection.

When the same generator polynomial is used, a set of candidate PSFCH sequences that can be used by a sidelink entity is defined, each sidelink entity may use a different PSFCH sequence between sidelink entities among the set. In this case, a cyclic shift value different from the cyclic shift values used in a PSFCH sequence set is used for a cyclic shift used to generate a PRS, different sequences can be used between sidelink entities. At this time, from the point of view of the SL communication system, a PRS CDMed with each PSFCH uses a cyclic shift value different from that of the PSFCH, but from the point of view of one sidelink entity, all PRSs CDMed with each PSFCH use the same sequence. That is, in FIG. 14, PRS #1 sequences that are CDMed with a PSFCH are the same sequences allocated to an SL entity #1, and PRS #2 may be interpreted similarly.

As such, since the method proposed in the present disclosure uses a sequence orthogonal to the entire PSFCH sequence set as a PRS sequence, it has the advantage of enabling orthogonal detection using CDM while using the same resource as a PSFCH in the frequency domain.

Another embodiment of interleaving a PSFCH and a PRS in terms of transmission by a specific sidelink entity is as follows. First, after determining a resource to be transmitted by multiplexing a PSFCH and a PRS, the PSFCH and the PRS may be divided into N equal parts, and interleaved so that the divided PSFCHs and the PRSs may be sequentially and alternately transmitted. That is, it can be transmitted in a pattern as in Equation 1 below.

$$\text{PSFCH}(0)-\text{PRS}(0)-\text{PSFCH}(1)-\text{PRS}(1)\ldots\text{PSFCH}(N-1)-\text{PRS}(N-1) \quad [\text{Equation 1}]$$

In this case, PSFCH(n) and PRS(n) represent the n-th parts of N-divided PSFCH and a PRS, respectively. If the length of a PSFCH and the length of a PRS are N, each of the PSFCH(n) and the PRS(n) may occupy one transport channel resource. Alternatively, when N=1, PSFCH(0) and PRS(0) become the same as the PSFCH and the PRS, and may be the same as the traditional FDM scheme. The above scheme may represent an operation in the case of interleaving after performing equal division of the same number irrespective of the lengths of a PSFCH and a PRS.

Or, if the lengths of a PSFCH and a PRS are not the same, after performing N divisions based on one channel of a relatively short length, and N division of only a part of a channel by the same length for another channel of a relatively long length, both channels divided by N may be interleaved as described above, and the remaining portion of the relatively long channel remaining without interleaving may be multiplexed with the interleaved portion through FDM. In one embodiment, transmission based on Equation 2 below may be possible.

$$\text{PSFCH}(0)-\text{PRS}(0)-\text{PSFCH}(1)-\text{PRS}(1)\ldots\text{PSFCH}(N-1)-\text{PRS}(N-1), \text{Remained PRS except }\{\text{PRS}(0)\ldots\text{PRS}(N-1)\} \quad [\text{Equation 2}]$$

Alternatively, when multiple UEs or entities such as gNB/eNB/RSU transmit PRS, the PRS transmitted by one entity may be transmitted in a comb pattern, at this time, for example, in the case of comb-N type pattern, a PRS by one entity is transmitted through a channel resource separated by N, PRSs transmitted by multiple entities can be multiplexed by different entities transmitting in the same comb-N type pattern at different transmission start points. In this case, by transmitting a PSFCH based on channel resources that can be used by one or a plurality of entities, the PSFCH may be multiplexed in an interleaved form with a PRS. In this case, the number of resources allocated to other entities occupied by a PSFCH may be determined by the amount of data to be transmitted by the PSFCH or the length of the PSFCH.

Alternatively, a PSFCH may be first divided into N in consideration of the minimum division length capable of maintaining the characteristics/performance of a PSFCH, similarly, N divided PSFCHs may be allocated to channel resources in consideration of the maximum equally spaced distance capable of maintaining the characteristics/performance of a PSFCH, and a PRS may be located for a resource that is divided into N and exists between allocated PSFCH resources. In this case, according to the length of a PRS and the number/length of equal divisions for a PRS, interleaving may be performed by equally dividing, otherwise, the divided PRS may be first interleaved, and the remaining non-interleaved portion may be FDMed in the form of a burst.

Alternatively, a PSFCH and a PRS may be (pre) configured by a higher layer or may be interleaved according to a rule configured by a PDCCH, MAC CE, or the like. In this case, the interleaving rule may be configured to interleave at a position where mutual interference is minimized considering the characteristics of a PSFCH and a PRS that are determined according to a data to be transmitted, or minimize distortion by a power amplifier and maximize reception performance by ensuring that the time domain PAPR value of a final interleaved signal or sequence is minimized Or by a service priority related to the QoS of transmission data related to a feedback transmitted by a PSFCH and a service priority of a positioning application to be provided through a PRS, an interleaving pattern may be configured in a direction to maximize performance by preferentially considering a channel/signal related to a service having a relatively high priority, and a channel/signal related to a service having a relatively low priority may be multiplexed according to an interleaving rule already configured.

In this case, a sequence of the same type as the sequence used for the PSFCH or a completely independent sequence may be used for a PRS. The purpose of using the same type of sequence is to reduce the complexity of a sequence detector/decoder or to reduce the PAPR of a final interleaved sequence. The purpose of using an independent type sequence may be to lower the PAPR of a final interleaved sequence or to minimize interference between interleaved sequences.

When using the same type of sequence for PRS and PSFCH, the same sequence polynomial can be used, in order to distinguish each of the interleaved sequences, different cyclic shifts or phase rotations in the frequency domain can be applied. In this case, a PRS may use a cyclic shift not used by a PSFCH or a phase rotation in the frequency domain. In addition, to maximize detection or decoding performance, a cyclic shift of a PRS or a phase rotation in the frequency domain is used or a PRS may be transmitted by allocating channel resources not used by a PSFCH.

The proposed disclosure is not limited to a PRS as a channel or signal interleaved and multiplexed with a PSFCH, and may be applied to other types of data, control or reference signals.

In the present disclosure, a method of multiplexing a PRS for positioning in an interleaved form with a PSFCH has been proposed. In the proposed embodiments, an interleaving method according to equal division, partial division, or a pre-configured rule was proposed according to the length, characteristics, performance of a PSFCH and a PRS, and the PAPR requirements of the finally interleaved sequence, in addition, an efficient multiplexing method was proposed in terms of resource utilization and PAPR reduction by considering the priority of interleaving according to service priority.

Figure 15:
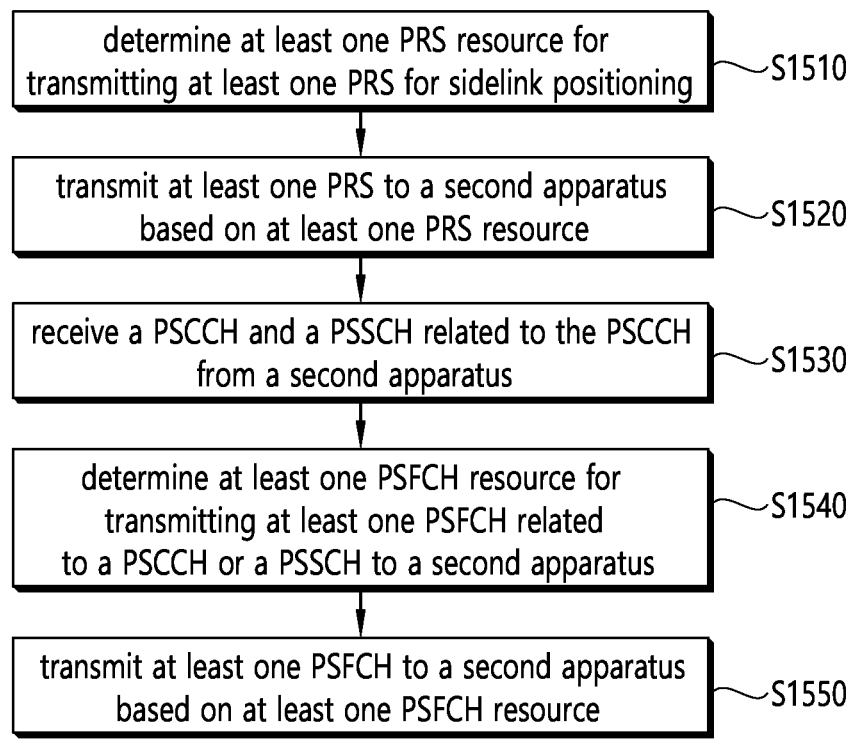
FIG. 15 is a flowchart showing an operation of a first apparatus according to an embodiment of the present disclosure.

FIG. 15 is a flowchart showing an operation of a first apparatus according to an embodiment of the present disclosure.

Operations disclosed in the flowchart of FIG. 15 may be performed in combination with various embodiments of the present disclosure. In one example, operations disclosed in the flowchart of FIG. 15 may be performed based on at least one of devices shown in FIGS. 17 to 22. In one example, a first apparatus of FIG. 15 may correspond to a first wireless device 100 of FIG. 18 to be described later. In another example, a first apparatus of FIG. 15 may correspond to a second wireless device 200 of FIG. 18 to be described later.

In step S1510, a first apparatus according to an embodiment may determine at least one positioning reference signal (PRS) resource for transmitting at least one PRS for sidelink positioning.

In step S1520, a first apparatus according to an embodiment may transmit the at least one PRS to a second apparatus based on the at least one PRS resource.

In step S1530, a first apparatus according to an embodiment may receive a physical sidelink control channel (PSCCH) and a physical sidelink shared channel (PSSCH) related to the PSCCH from the second apparatus.

In step S1540, a first apparatus according to an embodiment may determine at least one physical sidelink feedback channel (PSFCH) resource for transmitting at least one PSFCH related to the PSCCH or the PSSCH to the second apparatus.

In step S1550, a first apparatus according to an embodiment may transmit the at least one PSFCH to the second apparatus based on the at least one PSFCH resource.

In one embodiment, the at least one PRS resource is determined among a plurality of PRS resources for sidelink positioning. In addition, the at least one PSFCH resource may be determined among a plurality of PSFCH resources related to the PSCCH and the PSSCH. In addition, a time interval of the plurality of PRS resources and a time interval of the plurality of PSFCH resources may overlap each other. In addition, a frequency interval between the plurality of PSFCH resources may be the same as a first frequency size.

In some embodiments, the plurality of PRS resources may not overlap with the plurality of PSFCH resources.

In one embodiment, the plurality of PSFCH resources may include a first PSFCH resource, a second PSFCH resource and a third PSFCH resource. A frequency interval between the first PSFCH resource and the second PSFCH resource and a frequency interval between the second PSFCH resource and the third PSFCH resource may be the first frequency size. The sizes of frequency resource regions of the first PSFCH resource, the second PSFCH resource and the third PSFCH resource may be each a second frequency size.

In one embodiment, the plurality of PRS resources may include a first PRS resource and a second PRS resource. A first partition region of the first PRS resource may be located between the first PSFCH resource and the second PSFCH resource, a second partition region of the first PRS resource is located between the second PFSCH resource and the third PSFCH resource. A first partition region of the second PRS resource may be located between the first PSFCH resource and the second PSFCH resource, a second partition region of the second PRS resource is located between the second PSFCH resource and the third PSFCH resource.

In one embodiment, a frequency interval between the first partition region of the first PRS resource and the second partition region of the first PRS resource may be a third frequency size. A frequency interval between the first partition region of the second PRS resource and the second partition region of the second PRS resource may be the third frequency size.

In one embodiment, the sizes of frequency resource regions of the first partition region of the first PRS resource, the second partition region of the first PRS resource, the first partition region of the second PRS resource and the second partition region of the second PRS resource may be each a fourth frequency size.

In one embodiment, at least one of the first frequency size, the second frequency size, the third frequency size or the fourth frequency size may be configured based on a higher layer signaling, or determined based on downlink control information (DCI) received from a base station or a medium access control (MAC) control element (CE).

In one embodiment, based on that a first priority of a service related to the at least one PRS is higher than a second priority of a service related to the at least one PSFCH, the third frequency size or the fourth frequency size may be determined in advance based on the service related to the at least one PRS, the first frequency size or the second frequency size is determined later based on the third frequency size or the fourth frequency size determined in advance. In addition, based on that the second priority is higher than the first priority, the first frequency size or the second frequency size is determined in advance based on a service related to the at least one PSFCH, the third frequency size or the fourth frequency size may be determined later based on the first frequency size or the second frequency size determined in advance.

In one embodiment, based on that it is required that the first apparatus transmits another at least one PRS to the second apparatus based on a first resource excluding the plurality of PRS resources, the first resource may be transmitted based on a frequency resource region different from the plurality of PRS resources and the plurality of PSFCH resources in a time interval overlapping the plurality of PRS resources. In addition, based on that it is required that the first apparatus transmits another at least one PSFCH to the second apparatus based on a second resource excluding the plurality of PSFCH resources, the second resource may be transmitted based on a frequency resource region different from the plurality of PRS resources and the plurality of PSFCH resources in a time interval overlapping the plurality of PSFCH resources.

In some other embodiments, the plurality of PRS resources may overlap with the plurality of PSFCH resources.

In one embodiment, the plurality of PSFCH resources may include a first PSFCH resource, a second PSFCH resource and a third PSFCH resource. A frequency interval between the first PSFCH resource and the second PSFCH resource and a frequency interval between the second PSFCH resource and the third PSFCH resource may be the first frequency size. The plurality of PRS resources may include a third PRS resource and a fourth PRS resource. A first partition region of the third PRS resource may be the same as the first PSFCH resource, a second partition region of the third PRS resource is the same as the second PSFCH resource, a third partition region of the third PRS resource is the same as the third PSFCH resource. A first partition region of the fourth PRS resource may be the same as the first PSFCH resource, a second partition region of the fourth PRS resource is the same as the second PSFCH resource, a third partition region of the fourth PRS resource is the same as the third PRSFH resource.

In one embodiment, a sequence related to the first PSFCH resource, a sequence related to the first partition region of the third PRS resource and a sequence related to the first partition region of the fourth PRS resource may be generated based on different generator polynomials. A sequence related to the second PSFCH resource, a sequence related to the second partition region of the third PRS resource and a sequence related to the second partition region of the fourth PRS resource may be generated based on different generator polynomials. A sequence related to the third PSFCH resource, a sequence related to the third partition region of the third PRS resource and a sequence related to the third partition region of the fourth PRS resource may be generated base on different generator polynomials.

In one embodiment, a sequence related to the first PSFCH resource, a sequence related to the first partition region of the third PRS resource and a sequence related to the first partition region of the fourth PRS resource may be generated based on the same generator polynomial and different cyclic shifts. A sequence related to the second PSFCH resource, a sequence related to the second partition region of the third PRS resource and a sequence related to the second partition region of the fourth PRS resource may be generated based on the same generator polynomial and different cyclic shifts. A sequence related to the third PSFCH resource, a sequence related to the third partition region of the third PRS resource and a sequence related to the third partition region of the fourth PRS resource may be generated base on the same generator polynomial and different cyclic shifts.

According to an embodiment of the present disclosure, a first apparatus for performing wireless communication may be proposed. The first apparatus may comprise: one or more memories storing instructions; one or more transceivers; and one or more processors connected to the one or more memories and the one or more transceivers, wherein the one or more processors execute the instructions to: determine at least one positioning reference signal (PRS) resource for transmitting at least one PRS for sidelink positioning; transmit the at least one PRS to a second apparatus based on the at least one PRS resource; receive a physical sidelink control channel (PSCCH) and a physical sidelink shared channel (PSSCH) related to the PSCCH from the second apparatus; determine at least one physical sidelink feedback channel (PSFCH) resource for transmitting at least one PSFCH related to the PSCCH or the PSSCH to the second apparatus; and transmit the at least one PSFCH to the second apparatus based on the at least one PSFCH resource, wherein the at least one PRS resource is determined among a plurality of PRS resources for sidelink positioning, wherein the at least one PSFCH resource is determined among a plurality of PSFCH resources related to the PSCCH and the PSSCH, wherein a time interval of the plurality of PRS resources and a time interval of the plurality of PSFCH resources overlap each other, and wherein a frequency interval between the plurality of PSFCH resources is the same as a first frequency size.

According to an embodiment of the present disclosure, an apparatus (or chip(set)) configured to control a first user equipment (UE) may be proposed. The apparatus may comprise: one or more processors; and one or more memories operably connectable to the one or more processors and storing instructions, wherein the one or more processors execute the instructions to: determine at least one positioning reference signal (PRS) resource for transmitting at least one PRS for sidelink positioning; transmit the at least one PRS to a second UE based on the at least one PRS resource; receive a physical sidelink control channel (PSCCH) and a physical sidelink shared channel (PSSCH) related to the PSCCH from the second UE; determine at least one physical sidelink feedback channel (PSFCH) resource for transmitting at least one PSFCH related to the PSCCH or the PSSCH to the second UE; and transmit the at least one PSFCH to the second UE based on the at least one PSFCH resource, wherein the at least one PRS resource is determined among a plurality of PRS resources for sidelink positioning, wherein the at least one PSFCH resource is determined among a plurality of PSFCH resources related to the PSCCH and the PSSCH, wherein a time interval of the plurality of PRS resources and a time interval of the plurality of PSFCH resources overlap each other, and wherein a frequency interval between the plurality of PSFCH resources is the same as a first frequency size.

In one example, a first UE of the embodiment may refer to a first apparatus described in the first half of the present disclosure. In one example, the at least one processor and the at least one memory in the apparatus for controlling the first UE may be implemented as separate sub-chips, respectively, alternatively, at least two or more components may be implemented through one sub-chip.

According to an embodiment of the present disclosure, a non-transitory computer-readable storage medium storing instructions may be proposed. The instructions, when executed, may cause a first apparatus to: determine at least one positioning reference signal (PRS) resource for transmitting at least one PRS for sidelink positioning; transmit the at least one PRS to a second apparatus based on the at least one PRS resource; receive a physical sidelink control channel (PSCCH) and a physical sidelink shared channel (PSSCH) related to the PSCCH from the second apparatus; determine at least one physical sidelink feedback channel (PSFCH) resource for transmitting at least one PSFCH related to the PSCCH or the PSSCH to the second apparatus; and transmit the at least one PSFCH to the second apparatus based on the at least one PSFCH resource, wherein the at least one PRS resource is determined among a plurality of PRS resources for sidelink positioning, wherein the at least one PSFCH resource is determined among a plurality of PSFCH resources related to the PSCCH and the PSSCH, wherein a time interval of the plurality of PRS resources and a time interval of the plurality of PSFCH resources overlap each other, and wherein a frequency interval between the plurality of PSFCH resources is the same as a first frequency size.

Figure 16:
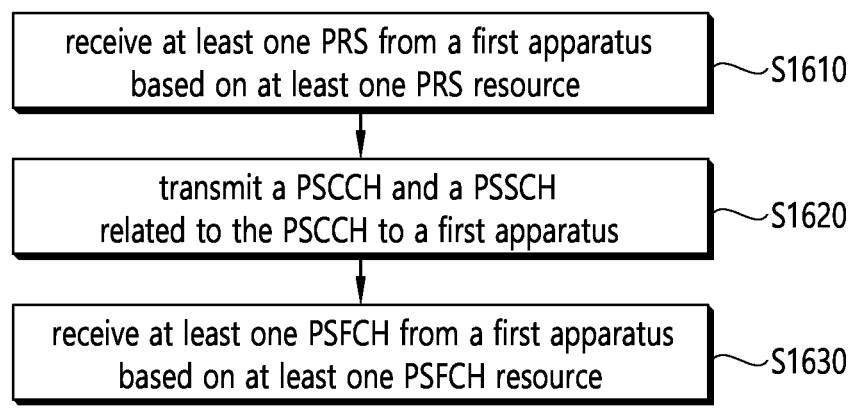
FIG. 16 is a flowchart showing an operation of a second apparatus according to an embodiment of the present disclosure.

FIG. 16 is a flowchart showing an operation of a second apparatus according to an embodiment of the present disclosure.

Operations disclosed in the flowchart of FIG. 16 may be performed in combination with various embodiments of the present disclosure. In one example, operations disclosed in the flowchart of FIG. 16 may be performed based on at least one of devices shown in FIGS. 17 to 22. In one example, a second apparatus of FIG. 16 may correspond to a second wireless device 200 of FIG. 18 to be described later. In another example, a second apparatus of FIG. 16 may correspond to a first wireless apparatus 100 of FIG. 18 to be described later.

In step S1610, a second apparatus according to an embodiment may receive at least one PRS from a first apparatus based on at least one PRS resource.

In step S1620, a second apparatus according to an embodiment may transmit a physical sidelink control channel (PSCCH) and a physical sidelink shared channel (PSSCH) related to the PSCCH to the first apparatus.

In step S1630, a second apparatus according to an embodiment may receive at least one PSFCH from the first apparatus based on at least one PSFCH resource.

In one embodiment, the at least one PRS resource may be determined among a plurality of PRS resources for sidelink positioning.

In one embodiment, the at least one PSFCH resource may be determined among a plurality of PSFCH resources related to the PSCCH and the PSSCH.

In one embodiment, a time interval of the plurality of PRS resources and a time interval of the plurality of PSFCH resources may overlap each other.

In one embodiment, a frequency interval between the plurality of PSFCH resources may be the same as a first frequency size.

In some embodiments, the plurality of PRS resources may not overlap with the plurality of PSFCH resources.

In one embodiment, the plurality of PSFCH resources may include a first PSFCH resource, a second PSFCH resource and a third PSFCH resource. A frequency interval between the first PSFCH resource and the second PSFCH resource and a frequency interval between the second PSFCH resource and the third PSFCH resource may be the first frequency size. The sizes of frequency resource regions of the first PSFCH resource, the second PSFCH resource and the third PSFCH resource may be each a second frequency size.

In one embodiment, the plurality of PRS resources may include a first PRS resource and a second PRS resource. A first partition region of the first PRS resource may be located between the first PSFCH resource and the second PSFCH resource, a second partition region of the first PRS resource is located between the second PFSCH resource and the third PSFCH resource. A first partition region of the second PRS resource may be located between the first PSFCH resource and the second PSFCH resource, a second partition region of the second PRS resource is located between the second PSFCH resource and the third PSFCH resource.

In one embodiment, a frequency interval between the first partition region of the first PRS resource and the second partition region of the first PRS resource may be a third frequency size. A frequency interval between the first partition region of the second PRS resource and the second partition region of the second PRS resource may be the third frequency size.

In one embodiment, the sizes of frequency resource regions of the first partition region of the first PRS resource, the second partition region of the first PRS resource, the first partition region of the second PRS resource and the second partition region of the second PRS resource may be each a fourth frequency size.

In one embodiment, at least one of the first frequency size, the second frequency size, the third frequency size or the fourth frequency size may be configured based on a higher layer signaling, or determined based on downlink control information (DCI) received from a base station or a medium access control (MAC) control element (CE).

In one embodiment, based on that a first priority of a service related to the at least one PRS is higher than a second priority of a service related to the at least one PSFCH, the third frequency size or the fourth frequency size may be determined in advance based on the service related to the at least one PRS, the first frequency size or the second frequency size is determined later based on the third frequency size or the fourth frequency size determined in advance. In addition, based on that the second priority is higher than the first priority, the first frequency size or the second frequency size is determined in advance based on a service related to the at least one PSFCH, the third frequency size or the fourth frequency size may be determined later based on the first frequency size or the second frequency size determined in advance.

In one embodiment, based on that it is required that the first apparatus transmits another at least one PRS to the second apparatus based on a first resource excluding the plurality of PRS resources, the first resource may be transmitted based on a frequency resource region different from the plurality of PRS resources and the plurality of PSFCH resources in a time interval overlapping the plurality of PRS resources. In addition, based on that it is required that the first apparatus transmits another at least one PSFCH to the second apparatus based on a second resource excluding the plurality of PSFCH resources, the second resource may be transmitted based on a frequency resource region different from the plurality of PRS resources and the plurality of PSFCH resources in a time interval overlapping the plurality of PSFCH resources.

In some other embodiments, the plurality of PRS resources may overlap with the plurality of PSFCH resources.

In one embodiment, the plurality of PSFCH resources may include a first PSFCH resource, a second PSFCH resource and a third PSFCH resource. A frequency interval between the first PSFCH resource and the second PSFCH resource and a frequency interval between the second PSFCH resource and the third PSFCH resource may be the first frequency size. The plurality of PRS resources may include a third PRS resource and a fourth PRS resource. A first partition region of the third PRS resource may be the same as the first PSFCH resource, a second partition region of the third PRS resource is the same as the second PSFCH resource, a third partition region of the third PRS resource is the same as the third PSFCH resource. A first partition region of the fourth PRS resource may be the same as the first PSFCH resource, a second partition region of the fourth PRS resource is the same as the second PSFCH resource, a third partition region of the fourth PRS resource is the same as the third PRSFH resource.

In one embodiment, a sequence related to the first PSFCH resource, a sequence related to the first partition region of the third PRS resource and a sequence related to the first partition region of the fourth PRS resource may be generated based on different generator polynomials. A sequence related to the second PSFCH resource, a sequence related to the second partition region of the third PRS resource and a sequence related to the second partition region of the fourth PRS resource may be generated based on different generator polynomials. A sequence related to the third PSFCH resource, a sequence related to the third partition region of the third PRS resource and a sequence related to the third partition region of the fourth PRS resource may be generated base on different generator polynomials.

In one embodiment, a sequence related to the first PSFCH resource, a sequence related to the first partition region of the third PRS resource and a sequence related to the first partition region of the fourth PRS resource may be generated based on the same generator polynomial and different cyclic shifts. A sequence related to the second PSFCH resource, a sequence related to the second partition region of the third PRS resource and a sequence related to the second partition region of the fourth PRS resource may be generated based on the same generator polynomial and different cyclic shifts. A sequence related to the third PSFCH resource, a sequence related to the third partition region of the third PRS resource and a sequence related to the third partition region of the fourth PRS resource may be generated base on the same generator polynomial and different cyclic shifts.

According to an embodiment of the present disclosure, a second apparatus for performing wireless communication may be proposed. The second apparatus may comprise: one or more memories storing instructions; one or more transceivers; and one or more processors connected to the one or more memories and the one or more transceivers, wherein the one or more processors execute the instructions to: receive at least one PRS from a first apparatus based on at least one PRS resource; transmit a physical sidelink control channel (PSCCH) and a physical sidelink shared channel (PSSCH) related to the PSCCH to the first apparatus; and receive at least one PSFCH from the first apparatus based on at least one PSFCH resource, wherein the at least one PRS resource is determined among a plurality of PRS resources for sidelink positioning, wherein the at least one PSFCH resource is determined among a plurality of PSFCH resources related to the PSCCH and the PSSCH, wherein a time interval of the plurality of PRS resources and a time interval of the plurality of PSFCH resources overlap each other, and wherein a frequency interval between the plurality of PSFCH resources is the same as a first frequency size.

Various embodiments of the present disclosure may be independently implemented. Alternatively, the various embodiments of the present disclosure may be implemented by being combined or merged. For example, although the various embodiments of the present disclosure have been described based on the 3GPP LTE system for convenience of explanation, the various embodiments of the present disclosure may also be extendedly applied to another system other than the 3GPP LTE system. For example, the various embodiments of the present disclosure may also be used in an uplink or downlink case without being limited only to direct communication between UEs. In this case, a base station, a relay node, or the like may use the proposed method according to various embodiments of the present disclosure. For example, it may be defined that information on whether to apply the method according to various embodiments of the present disclosure is reported by the base station to the UE or by a transmitting UE to a receiving UE through pre-defined signaling (e.g., physical layer signaling or higher layer signaling). For example, it may be defined that information on a rule according to various embodiments of the present disclosure is reported by the base station to the UE or by a transmitting UE to a receiving UE through pre-defined signaling (e.g., physical layer signaling or higher layer signaling). For example, some embodiments among various embodiments of the present disclosure may be applied limitedly only to a resource allocation mode 1. For example, some embodiments among various embodiments of the present disclosure may be applied limitedly only to a resource allocation mode 2.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 17:
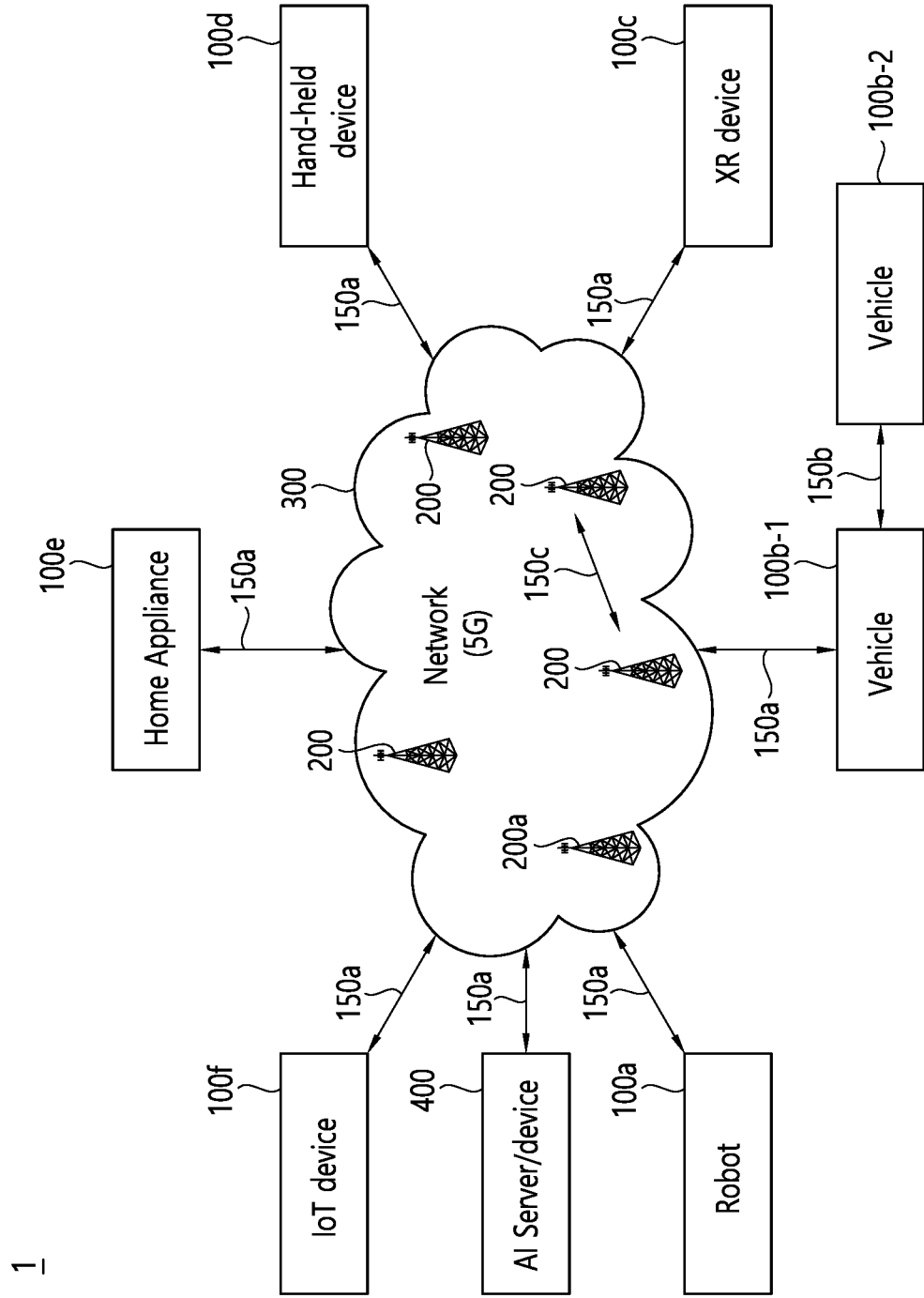
FIG. 17 shows a communication system 1, based on an embodiment of the present disclosure.

FIG. 17 shows a communication system 1, based on an embodiment of the present disclosure.

Referring to FIG. 17, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

Here, wireless communication technology implemented in wireless devices 100a to 100f of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100a to 100f of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, and is not limited to the name described above. Additionally or alternatively, the wireless communication technology implemented in the wireless devices 100a to 100f of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g., relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 18:
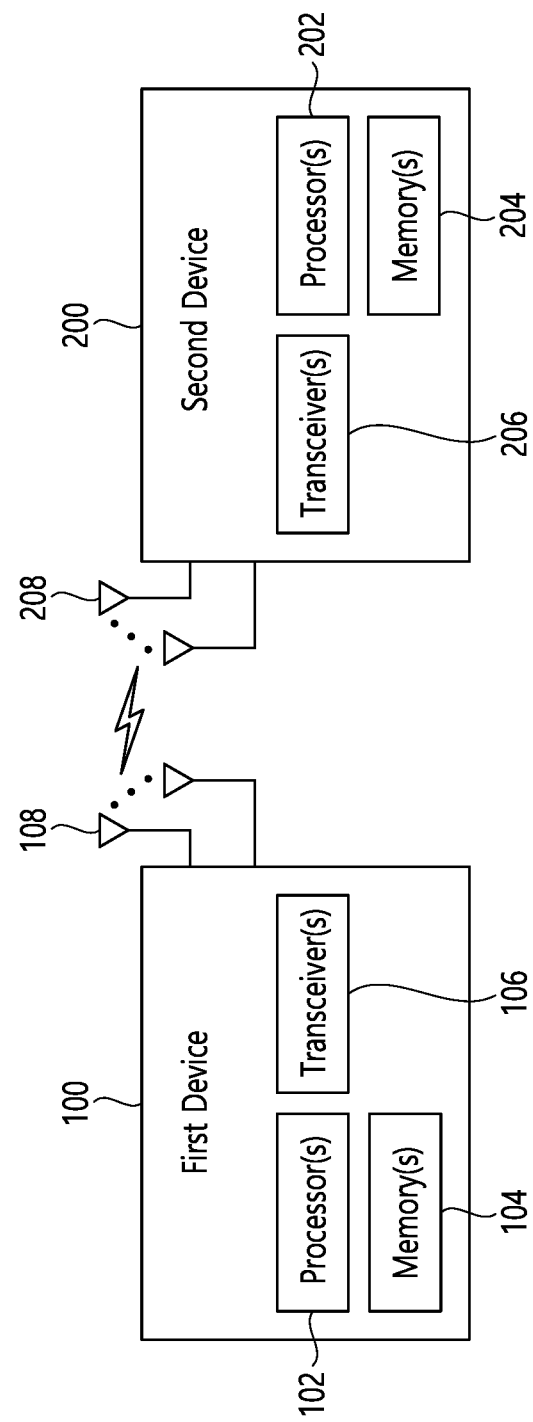
FIG. 18 shows wireless devices, based on an embodiment of the present disclosure.

FIG. 18 shows wireless devices, based on an embodiment of the present disclosure.

Referring to FIG. 18, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 17.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 19:
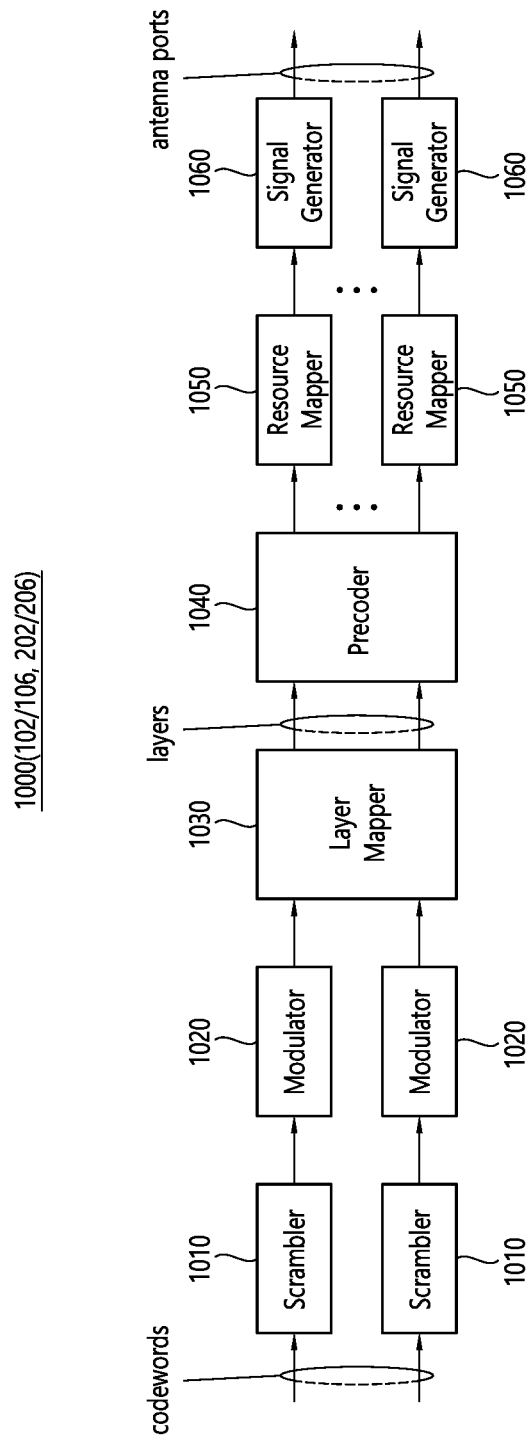
FIG. 19 shows a signal process circuit for a transmission signal, based on an embodiment of the present disclosure.

FIG. 19 shows a signal process circuit for a transmission signal, based on an embodiment of the present disclosure.

Referring to FIG. 19, a signal processing circuit 1000 may include scramblers 1010, modulators 1020, a layer mapper 1030, a precoder 1040, resource mappers 1050, and signal generators 1060. An operation/function of FIG. 19 may be performed, without being limited to, the processors 102 and 202 and/or the transceivers 106 and 206 of FIG. 18. Hardware elements of FIG. 19 may be implemented by the processors 102 and 202 and/or the transceivers 106 and 206 of FIG. 18. For example, blocks 1010 to 1060 may be implemented by the processors 102 and 202 of FIG. 18. Alternatively, the blocks 1010 to 1050 may be implemented by the processors 102 and 202 of FIG. 18 and the block 1060 may be implemented by the transceivers 106 and 206 of FIG. 18.

Codewords may be converted into radio signals via the signal processing circuit 1000 of FIG. 19. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 19. For example, the wireless devices (e.g., 100 and 200 of FIG. 18) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 20:
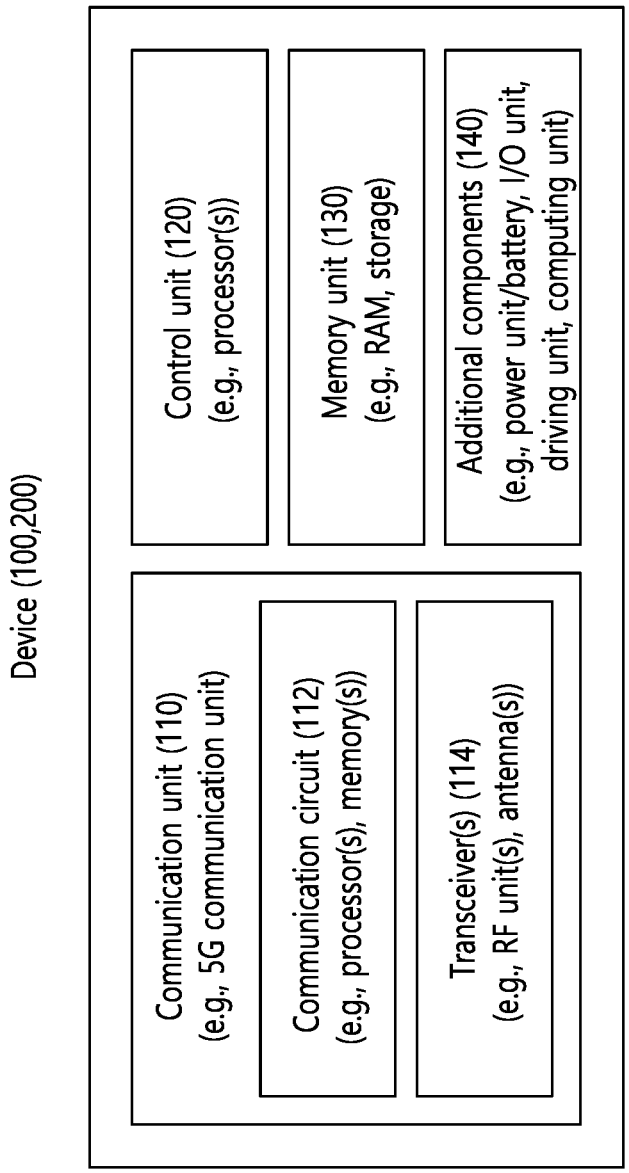
FIG. 20 shows another example of a wireless device, based on an embodiment of the present disclosure.

FIG. 20 shows another example of a wireless device, based on an embodiment of the present disclosure. The wireless device may be implemented in various forms according to a use-case/service (refer to FIG. 17).

Referring to FIG. 20, wireless devices 100 and 200 may correspond to the wireless devices 100 and 200 of FIG. 18 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 18. For example, the transceiver(s) 114 may include the one or more transceivers 106 and 206 and/or the one or more antennas 108 and 208 of FIG. 18. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 17), the vehicles (100*b*-1 and 100*b*-2 of FIG. 17), the XR device (100*c* of FIG. 17), the hand-held device (100*d* of FIG. 17), the home appliance (100*e* of FIG. 17), the IoT device (100*f* of FIG. 17), a digital broadcast terminal, a hologram device, a public safety device, an MTC device, a medicine device, a fintech device (or a finance device), a security device, a climate/environment device, the AI server/device (400 of FIG. 17), the BSs (200 of FIG. 17), a network node, etc. The wireless device may be used in a mobile or fixed place according to a use-example/service.

In FIG. 20, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 20 will be described in detail with reference to the drawings.

Figure 21:
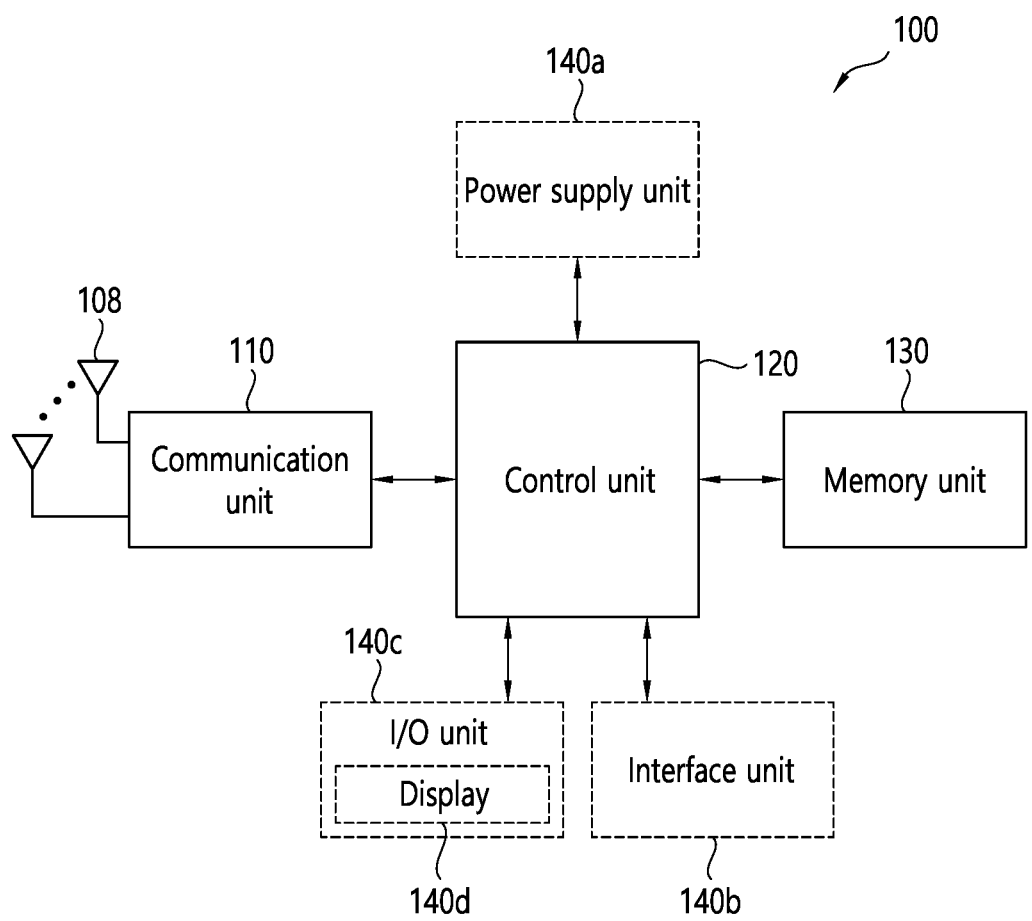
FIG. 21 shows a hand-held device, based on an embodiment of the present disclosure.

FIG. 21 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 21, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 20, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 22:
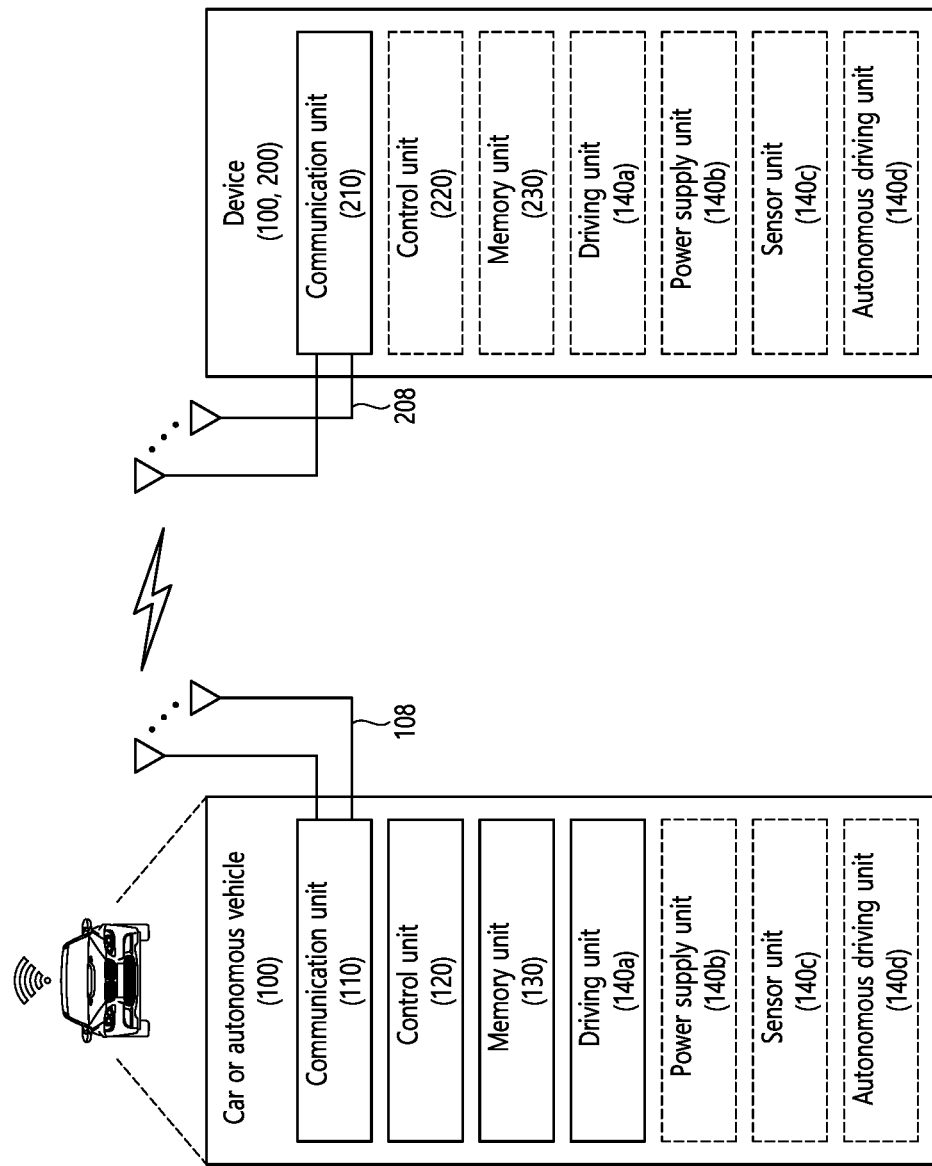
FIG. 22 shows a vehicle or an autonomous vehicle, based on an embodiment of the present disclosure.

FIG. 22 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc.

Referring to FIG. 22, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 20, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

The scope of the disclosure may be represented by the following claims, and it should be construed that all changes or modifications derived from the meaning and scope of the claims and their equivalents may be included in the scope of the disclosure.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing, by a first apparatus, sidelink communication, the method comprising:
    determining at least one positioning reference signal (PRS) resource for transmitting at least one PRS for sidelink positioning;
    transmitting the at least one PRS to a second apparatus based on the at least one PRS resource;
    receiving a physical sidelink control channel (PSCCH) and a physical sidelink shared channel (PSSCH) related to the PSCCH from the second apparatus;
    determining at least one physical sidelink feedback channel (PSFCH) resource for transmitting at least one PSFCH related to the PSCCH or the PSSCH to the second apparatus; and
    transmitting the at least one PSFCH to the second apparatus based on the at least one PSFCH resource,
    wherein the at least one PRS resource is determined among a plurality of PRS resources for sidelink positioning,
    wherein the at least one PSFCH resource is determined among a plurality of PSFCH resources related to the PSCCH and the PSSCH,
    wherein a time interval of the plurality of PRS resources and a time interval of the plurality of PSFCH resources overlap each other, and
    wherein a frequency interval between the plurality of PSFCH resources is the same as a first frequency size.

2. The method of claim 1, wherein the plurality of PRS resources do not overlap with the plurality of PSFCH resources.

3. The method of claim 2, wherein the plurality of PSFCH resources include a first PSFCH resource, a second PSFCH resource and a third PSFCH resource,
    wherein a frequency interval between the first PSFCH resource and the second PSFCH resource and a frequency interval between the second PSFCH resource and the third PSFCH resource are the first frequency size, and
    wherein the sizes of frequency resource regions of the first PSFCH resource, the second PSFCH resource and the third PSFCH resource are each a second frequency size.

4. The method of claim 3, wherein the plurality of PRS resources include a first PRS resource and a second PRS resource,
    wherein a first partition region of the first PRS resource is located between the first PSFCH resource and the second PSFCH resource, a second partition region of the first PRS resource is located between the second PFSCH resource and the third PSFCH resource, and
    wherein a first partition region of the second PRS resource is located between the first PSFCH resource and the second PSFCH resource, a second partition region of the second PRS resource is located between the second PSFCH resource and the third PSFCH resource.

5. The method of claim 4, wherein a frequency interval between the first partition region of the first PRS resource and the second partition region of the first PRS resource is a third frequency size, and
    wherein a frequency interval between the first partition region of the second PRS resource and the second partition region of the second PRS resource is the third frequency size.

6. The method of claim 5, wherein the sizes of frequency resource regions of the first partition region of the first PRS resource, the second partition region of the first PRS resource, the first partition region of the second PRS resource and the second partition region of the second PRS resource are each a fourth frequency size.

7. The method of claim 6, wherein at least one of the first frequency size, the second frequency size, the third frequency size or the fourth frequency size is configured based on a higher layer signaling, or determined based on downlink control information (DCI) received from a base station or a medium access control (MAC) control element (CE).

8. The method of claim 1, wherein the plurality of PRS resources overlap with the plurality of PSFCH resources.

9. The method of claim 8, wherein the plurality of PSFCH resources include a first PSFCH resource, a second PSFCH resource and a third PSFCH resource,
    wherein a frequency interval between the first PSFCH resource and the second PSFCH resource and a frequency interval between the second PSFCH resource and the third PSFCH resource are the first frequency size,
    wherein the plurality of PRS resources include a third PRS resource and a fourth PRS resource,
    wherein a first partition region of the third PRS resource is the same as the first PSFCH resource, a second partition region of the third PRS resource is the same as the second PSFCH resource, a third partition region of the third PRS resource is the same as the third PSFCH resource,
    wherein a first partition region of the fourth PRS resource is the same as the first PSFCH resource, a second partition region of the fourth PRS resource is the same as the second PSFCH resource, a third partition region of the fourth PRS resource is the same as the third PRSFH resource.

10. The method of claim 9, wherein a sequence related to the first PSFCH resource, a sequence related to the first partition region of the third PRS resource and a sequence related to the first partition region of the fourth PRS resource are generated based on different generator polynomials,
    wherein a sequence related to the second PSFCH resource, a sequence related to the second partition region of the third PRS resource and a sequence related to the second partition region of the fourth PRS resource are generated based on different generator polynomials, and
    wherein a sequence related to the third PSFCH resource, a sequence related to the third partition region of the third PRS resource and a sequence related to the third partition region of the fourth PRS resource are generated base on different generator polynomials.

11. The method of claim 9, wherein a sequence related to the first PSFCH resource, a sequence related to the first partition region of the third PRS resource and a sequence related to the first partition region of the fourth PRS resource are generated based on the same generator polynomial and different cyclic shifts, wherein a sequence related to the second PSFCH resource, a sequence related to the second partition region of the third PRS resource and a sequence related to the second partition region of the fourth PRS resource are generated based on the same generator polynomial and different cyclic shifts, and wherein a sequence related to the third PSFCH resource, a sequence related to the third partition region of the third PRS resource and a sequence related to the third partition region of the fourth PRS resource are generated base on the same generator polynomial and different cyclic shifts.

12. The method of claim 7, wherein based on that a first priority of a service related to the at least one PRS is higher than a second priority of a service related to the at least one PSFCH, the third frequency size or the fourth frequency size is determined in advance based on the service related to the at least one PRS, the first frequency size or the second frequency size is determined later based on the third frequency size or the fourth frequency size determined in advance, and wherein based on that the second priority is higher than the first priority, the first frequency size or the second frequency size is determined in advance based on a service related to the at least one PSFCH, the third frequency size or the fourth frequency size is determined later based on the first frequency size or the second frequency size determined in advance.

13. The method of claim 12, wherein based on that it is required that the first apparatus transmits another at least one PRS to the second apparatus based on a first resource excluding the plurality of PRS resources, the first resource is transmitted based on a frequency resource region different from the plurality of PRS resources and the plurality of PSFCH resources in a time interval overlapping the plurality of PRS resources, and wherein based on that it is required that the first apparatus transmits another at least one PSFCH to the second apparatus based on a second resource excluding the plurality of PSFCH resources, the second resource is transmitted based on a frequency resource region different from the plurality of PRS resources and the plurality of PSFCH resources in a time interval overlapping the plurality of PSFCH resources.

14. A first apparatus for performing wireless communication, the first apparatus comprising:
    one or more memories storing instructions;
    one or more transceivers; and
    one or more processors connected to the one or more memories and the one or more transceivers, wherein the one or more processors execute the instructions to:

determine at least one positioning reference signal (PRS) resource for transmitting at least one PRS for sidelink positioning;

transmit the at least one PRS to a second apparatus based on the at least one PRS resource;

receive a physical sidelink control channel (PSCCH) and a physical sidelink shared channel (PSSCH) related to the PSCCH from the second apparatus;

determine at least one physical sidelink feedback channel (PSFCH) resource for transmitting at least one PSFCH related to the PSCCH or the PSSCH to the second apparatus; and transmit the at least one PSFCH to the second apparatus based on the at least one PSFCH resource, wherein the at least one PRS resource is determined among a plurality of PRS resources for sidelink positioning, wherein the at least one PSFCH resource is determined among a plurality of PSFCH resources related to the PSCCH and the PSSCH, wherein a time interval of the plurality of PRS resources and a time interval of the plurality of PSFCH resources overlap each other, and wherein a frequency interval between the plurality of PSFCH resources is the same as a first frequency size.

15. An apparatus configured to control a first user equipment (UE), the apparatus comprising:
    one or more processors; and
    one or more memories operably connectable to the one or more processors and storing instructions, wherein the one or more processors execute the instructions to:

determine at least one positioning reference signal (PRS) resource for transmitting at least one PRS for sidelink positioning;

transmit the at least one PRS to a second UE based on the at least one PRS resource;

receive a physical sidelink control channel (PSCCH) and a physical sidelink shared channel (PSSCH) related to the PSCCH from the second UE;

determine at least one physical sidelink feedback channel (PSFCH) resource for transmitting at least one PSFCH related to the PSCCH or the PSSCH to the second UE; and transmit the at least one PSFCH to the second UE based on the at least one PSFCH resource, wherein the at least one PRS resource is determined among a plurality of PRS resources for sidelink positioning, wherein the at least one PSFCH resource is determined among a plurality of PSFCH resources related to the PSCCH and the PSSCH, wherein a time interval of the plurality of PRS resources and a time interval of the plurality of PSFCH resources overlap each other, and wherein a frequency interval between the plurality of PSFCH resources is the same as a first frequency size.

\* \* \* \* \*